United States Patent
Davis et al.

(10) Patent No.: US 10,877,695 B2
(45) Date of Patent: Dec. 29, 2020

(54) MEMCACHED SERVER FUNCTIONALITY IN A CLUSTER OF DATA PROCESSING NODES

(71) Applicant: III Holdings 2, LLC, Wilmington, DE (US)

(72) Inventors: Mark Bradley Davis, Austin, TX (US); Prashant R. Chandra, San Jose, CA (US)

(73) Assignee: III Holdings 2, LLC, Wilmington, DE (US)

( * ) Notice: Subject to any disclaimer, the term of this patent is extended or adjusted under 35 U.S.C. 154(b) by 22 days.

(21) Appl. No.: 16/198,619

(22) Filed: Nov. 21, 2018

(65) Prior Publication Data

US 2020/0159449 A1 May 21, 2020

Related U.S. Application Data

(63) Continuation of application No. 15/357,332, filed on Nov. 21, 2016, now Pat. No. 10,140,245, which is a
(Continued)

(51) Int. Cl.
*G06F 3/06* (2006.01)
*H04L 29/08* (2006.01)

(52) U.S. Cl.
CPC .......... *G06F 3/0659* (2013.01); *G06F 3/0604* (2013.01); *G06F 3/067* (2013.01); *H04L 67/2842* (2013.01)

(58) Field of Classification Search
CPC ...... G06F 3/0659; G06F 3/0656; G06F 3/067; G06F 12/00; H04L 67/2842; H04L 49/356; H04L 49/357; H04L 49/3009
See application file for complete search history.

(56) References Cited

U.S. PATENT DOCUMENTS

| | | |
|---|---|---|
| 5,451,936 A | 9/1995 | Yang et al. |
| 5,594,908 A | 1/1997 | Hyatt |

(Continued)

FOREIGN PATENT DOCUMENTS

| | | |
|---|---|---|
| DE | 60216001 | 7/2007 |
| DE | 10 2008 001 875 | 6/2010 |

(Continued)

OTHER PUBLICATIONS

Advanced Switching Technology Tech Brief, published 2005, 2 pages.
(Continued)

*Primary Examiner* — Ernest Unelus
(74) *Attorney, Agent, or Firm* — Brinks Gilson & Lione

(57) ABSTRACT

A method is performed by a first server on a chip (SoC) node that is one instance of a plurality of nodes within a cluster of nodes. An operation is performed for determine if a second one of the SoC nodes in the cluster has data stored thereon corresponding to a data identifier in response to receiving a data retrieval request including the data identifier. An operation is performed for determining if a remote memory access channel exists between the SoC node and the second one of the SoC nodes. An operation is performed for access the data from the second one of the SoC nodes using the remote memory access channel after determine that the second one of the SoC nodes has the data stored thereon and that the remote memory access channel exists between the SoC node and the second one of the SoC nodes.

19 Claims, 17 Drawing Sheets

Related U.S. Application Data continuation of application No. 13/728,428, filed on Dec. 27, 2012, now Pat. No. 9,648,102, which is a continuation-in-part of application No. 13/453,086, filed on Apr. 23, 2012, now Pat. No. 8,599,863, which is a continuation-in-part of application No. 12/794,996, filed on Jun. 7, 2010, now abandoned.

(60) Provisional application No. 61/256,723, filed on Oct. 30, 2009.

(56) References Cited

U.S. PATENT DOCUMENTS

| | | |
|---|---|---|
| 5,623,641 A | 4/1997 | Kadoyashiki |
| 5,781,187 A | 7/1998 | Gephardt et al. |
| 5,901,048 A | 5/1999 | Hu |
| 5,908,468 A | 6/1999 | Hartmann |
| 5,968,176 A | 10/1999 | Nessett et al. |
| 5,971,804 A | 10/1999 | Gallagher et al. |
| 6,055,618 A | 4/2000 | Thorson |
| 6,141,214 A | 10/2000 | Ahn |
| 6,181,699 B1 | 1/2001 | Crinion et al. |
| 6,192,414 B1 | 2/2001 | Horn |
| 6,198,741 B1 | 3/2001 | Yoshizawa et al. |
| 6,252,878 B1 | 6/2001 | Locklear, Jr. et al. |
| 6,314,487 B1 | 11/2001 | Hahn et al. |
| 6,314,501 B1 | 11/2001 | Gulick et al. |
| 6,373,841 B1 | 4/2002 | Goh et al. |
| 6,442,137 B1 | 8/2002 | Yu et al. |
| 6,446,192 B1 | 9/2002 | Narasimhan et al. |
| 6,452,809 B1 | 9/2002 | Jackson et al. |
| 6,507,586 B1 | 1/2003 | Satran et al. |
| 6,556,952 B1 | 4/2003 | Magro |
| 6,574,238 B1 | 6/2003 | Thrysoe |
| 6,661,671 B1 | 12/2003 | Franke et al. |
| 6,711,691 B1 | 3/2004 | Howard et al. |
| 6,766,389 B2 | 7/2004 | Hayter et al. |
| 6,813,676 B1 | 11/2004 | Henry et al. |
| 6,816,750 B1 | 11/2004 | Klaas |
| 6,842,430 B1 | 1/2005 | Melnik |
| 6,857,026 B1 | 2/2005 | Cain |
| 6,963,926 B1 | 11/2005 | Robinson |
| 6,963,948 B1 | 11/2005 | Gulick |
| 6,977,939 B2 | 12/2005 | Joy et al. |
| 6,988,170 B2 | 1/2006 | Barroso et al. |
| 6,990,063 B1 | 1/2006 | Lenoski et al. |
| 7,020,695 B1 | 3/2006 | Kundu et al. |
| 7,032,119 B2 | 4/2006 | Fung |
| 7,080,078 B1 | 7/2006 | Slaughter et al. |
| 7,080,283 B1 | 7/2006 | Songer et al. |
| 7,095,738 B1 | 8/2006 | Desanti |
| 7,119,591 B1 | 10/2006 | Lin |
| 7,143,153 B1 | 11/2006 | Black et al. |
| 7,165,120 B1 | 1/2007 | Giles et al. |
| 7,170,315 B2 | 1/2007 | Bakker et al. |
| 7,180,866 B1 | 2/2007 | Chartre et al. |
| 7,203,063 B2 | 4/2007 | Bash et al. |
| 7,257,655 B1 | 8/2007 | Burney et al. |
| 7,263,288 B1 | 8/2007 | Islam |
| 7,274,705 B2 | 9/2007 | Chang et al. |
| 7,278,582 B1 | 10/2007 | Siegel et al. |
| 7,310,319 B2 | 12/2007 | Awsienko et al. |
| 7,325,050 B2 | 1/2008 | O'Connor et al. |
| 7,337,333 B2 | 2/2008 | O'Conner et al. |
| 7,340,777 B1 | 3/2008 | Szor |
| 7,353,362 B2 | 4/2008 | Georgiou et al. |
| 7,382,154 B2 | 6/2008 | Ramos et al. |
| 7,386,888 B2 | 6/2008 | Liang et al. |
| 7,418,534 B2 | 8/2008 | Hayter et al. |
| 7,437,540 B2 | 10/2008 | Paolucci et al. |
| 7,447,147 B2 | 11/2008 | Nguyen et al. |
| 7,447,197 B2 | 11/2008 | Terrell et al. |
| 7,466,712 B2 | 12/2008 | Makishima et al. |
| 7,467,306 B2 | 12/2008 | Cartes et al. |
| 7,467,358 B2 | 12/2008 | Kang et al. |
| 7,502,884 B1 | 3/2009 | Shah et al. |
| 7,519,843 B1 | 4/2009 | Buterbaugh et al. |
| 7,555,666 B2 | 6/2009 | Brundridge et al. |
| 7,583,661 B2 | 9/2009 | Chaudhuri |
| 7,586,841 B2 | 9/2009 | Vasseur |
| 7,596,144 B2 | 9/2009 | Pong |
| 7,599,360 B2 | 10/2009 | Edsall et al. |
| 7,606,225 B2 | 10/2009 | Xie et al. |
| 7,606,245 B2 | 10/2009 | Ma et al. |
| 7,616,646 B1 | 11/2009 | Ma et al. |
| 7,620,057 B1 | 11/2009 | Aloni et al. |
| 7,644,215 B2 | 1/2010 | Wallace et al. |
| 7,657,677 B2 | 2/2010 | Huang et al. |
| 7,657,756 B2 | 2/2010 | Hall |
| 7,660,922 B2 | 2/2010 | Harriman |
| 7,664,110 B1 | 2/2010 | Lovett et al. |
| 7,673,164 B1 | 3/2010 | Agarwal |
| 7,710,936 B2 | 5/2010 | Morales Barroso |
| 7,719,834 B2 | 5/2010 | Miyamoto et al. |
| 7,721,125 B2 | 5/2010 | Fung |
| 7,751,433 B2 | 7/2010 | Dollo et al. |
| 7,760,720 B2 | 7/2010 | Pullela et al. |
| 7,761,687 B2 | 7/2010 | Blumrich et al. |
| 7,783,910 B2 | 8/2010 | Felter et al. |
| 7,791,894 B2 | 9/2010 | Bechtolsheim |
| 7,792,113 B1 | 9/2010 | Foschiano et al. |
| 7,796,399 B2 | 9/2010 | Clayton et al. |
| 7,801,132 B2 | 9/2010 | Ofek et al. |
| 7,802,017 B2 | 9/2010 | Uemura et al. |
| 7,805,575 B1 | 9/2010 | Agarwal et al. |
| 7,831,839 B2 | 11/2010 | Hatakeyama |
| 7,840,703 B2 | 11/2010 | Arimilli et al. |
| 7,865,614 B2 | 1/2011 | Lu et al. |
| 7,925,795 B2 | 4/2011 | Tamir et al. |
| 7,934,005 B2 | 4/2011 | Fascenda |
| 7,970,929 B1 | 6/2011 | Mahalingaiah |
| 7,975,110 B1 | 7/2011 | Spaur et al. |
| 7,991,817 B2 | 8/2011 | Dehon et al. |
| 7,991,922 B2 | 8/2011 | Hayter et al. |
| 7,992,151 B2 | 8/2011 | Warrier et al. |
| 8,019,832 B2 | 9/2011 | De Sousa et al. |
| 8,060,760 B2 | 11/2011 | Shetty et al. |
| 8,060,775 B1 | 11/2011 | Sharma et al. |
| 8,082,400 B1 | 12/2011 | Chang et al. |
| 8,108,508 B1 | 1/2012 | Goh et al. |
| 8,122,269 B2 | 2/2012 | Houlihan et al. |
| 8,132,034 B2 | 3/2012 | Lambert et al. |
| 8,155,113 B1 | 4/2012 | Agarwal |
| 8,156,362 B2 | 4/2012 | Branover et al. |
| 8,165,120 B2 | 4/2012 | Maruccia et al. |
| 8,170,040 B2 | 5/2012 | Konda |
| 8,180,996 B2 | 5/2012 | Fullerton et al. |
| 8,189,612 B2 | 5/2012 | Lemaire et al. |
| 8,194,659 B2 | 6/2012 | Ban |
| 8,199,636 B1 | 6/2012 | Rouyer et al. |
| 8,205,103 B2 | 6/2012 | Kazama et al. |
| 8,379,425 B2 | 2/2013 | Fukuoka et al. |
| 8,397,092 B2 | 3/2013 | Karnowski |
| 8,407,428 B2 | 3/2013 | Cheriton et al. |
| 8,504,791 B2 | 8/2013 | Cheriton et al. |
| RE44,610 E | 11/2013 | Krakirian et al. |
| 8,599,863 B2 | 12/2013 | Davis |
| 8,684,802 B1 | 4/2014 | Gross et al. |
| 8,738,860 B1 | 5/2014 | Griffin et al. |
| 8,745,275 B2 | 6/2014 | Ikeya et al. |
| 8,745,302 B2 | 6/2014 | Davis et al. |
| 8,782,321 B2 | 7/2014 | Harriman et al. |
| 8,812,400 B2 | 8/2014 | Faraboschi et al. |
| 8,824,485 B2 | 9/2014 | Biswas et al. |
| 8,854,831 B2 | 10/2014 | Arnouse |
| 8,903,964 B2 | 12/2014 | Breslin et al. |
| 9,008,079 B2 | 4/2015 | Davis et al. |
| 9,075,655 B2 | 7/2015 | Davis et al. |
| 9,311,269 B2 | 4/2016 | Davis et al. |
| 9,465,771 B2 | 10/2016 | Davis et al. |
| 2001/0046227 A1 | 11/2001 | Matsuhira et al. |
| 2002/0004912 A1 | 1/2002 | Fung |
| 2002/0040391 A1 | 4/2002 | Chaiken et al. |
| 2002/0083352 A1 | 6/2002 | Fujimoto et al. |

(56) References Cited

U.S. PATENT DOCUMENTS

| | | |
|---|---|---|
| 2002/0097732 A1 | 7/2002 | Worster et al. |
| 2002/0107903 A1 | 8/2002 | Richter et al. |
| 2002/0124128 A1 | 9/2002 | Qiu |
| 2002/0159452 A1 | 10/2002 | Foster et al. |
| 2002/0161917 A1 | 10/2002 | Shapiro et al. |
| 2002/0172205 A1 | 11/2002 | Tagore-Brage et al. |
| 2002/0186656 A1 | 12/2002 | Vu |
| 2002/0194412 A1 | 12/2002 | Bottom |
| 2002/0196611 A1 | 12/2002 | Ho et al. |
| 2003/0007493 A1 | 1/2003 | Oi et al. |
| 2003/0033547 A1 | 2/2003 | Larson et al. |
| 2003/0041266 A1 | 2/2003 | Ke et al. |
| 2003/0076832 A1 | 4/2003 | Ni |
| 2003/0093255 A1 | 5/2003 | Freyensee et al. |
| 2003/0093624 A1 | 5/2003 | Arimilli et al. |
| 2003/0110262 A1 | 6/2003 | Hasan et al. |
| 2003/0140190 A1 | 7/2003 | Mahony et al. |
| 2003/0158940 A1 | 8/2003 | Leigh |
| 2003/0159083 A1 | 8/2003 | Fukuhara et al. |
| 2003/0172191 A1 | 9/2003 | Williams |
| 2003/0188083 A1 | 10/2003 | Kumar et al. |
| 2003/0193402 A1 | 10/2003 | Post et al. |
| 2003/0202520 A1 | 10/2003 | Witkowski et al. |
| 2003/0231624 A1 | 12/2003 | Alappat et al. |
| 2004/0013113 A1 | 1/2004 | Singh et al. |
| 2004/0017806 A1 | 1/2004 | Yazdy et al. |
| 2004/0017808 A1 | 1/2004 | Forbes et al. |
| 2004/0030938 A1 | 2/2004 | Barr et al. |
| 2004/0068676 A1 | 4/2004 | Larson et al. |
| 2004/0111612 A1 | 6/2004 | Choi et al. |
| 2004/0141521 A1 | 7/2004 | George |
| 2004/0165588 A1 | 8/2004 | Pandya |
| 2004/0210693 A1 | 10/2004 | Zeitler et al. |
| 2004/0215864 A1 | 10/2004 | Arimilli et al. |
| 2004/0215991 A1 | 10/2004 | McAfee et al. |
| 2004/0267486 A1 | 12/2004 | Percer et al. |
| 2005/0015378 A1 | 1/2005 | Gammel et al. |
| 2005/0018604 A1 | 1/2005 | Dropps et al. |
| 2005/0018606 A1 | 1/2005 | Dropps et al. |
| 2005/0018663 A1 | 1/2005 | Dropps et al. |
| 2005/0021606 A1 | 1/2005 | Davies et al. |
| 2005/0021728 A1 | 1/2005 | Sugimoto |
| 2005/0030954 A1 | 2/2005 | Dropps et al. |
| 2005/0033742 A1 | 2/2005 | Kamvar et al. |
| 2005/0033890 A1 | 2/2005 | Lee |
| 2005/0044195 A1 | 2/2005 | Westfall |
| 2005/0077921 A1 | 4/2005 | Percer et al. |
| 2005/0105538 A1 | 5/2005 | Perera et al. |
| 2005/0141424 A1 | 6/2005 | Lim et al. |
| 2005/0228852 A1 | 10/2005 | Santos et al. |
| 2005/0240688 A1 | 10/2005 | Moerman et al. |
| 2005/0259397 A1 | 11/2005 | Bash et al. |
| 2006/0002311 A1 | 1/2006 | Iwanaga et al. |
| 2006/0013218 A1 | 1/2006 | Shore et al. |
| 2006/0023245 A1 | 2/2006 | Sato et al. |
| 2006/0029053 A1 | 2/2006 | Roberts et al. |
| 2006/0090025 A1 | 4/2006 | Tufford et al. |
| 2006/0136570 A1 | 6/2006 | Pandya |
| 2006/0140211 A1 | 6/2006 | Huang et al. |
| 2006/0174342 A1 | 8/2006 | Zaheer et al. |
| 2006/0179241 A1 | 8/2006 | Clark et al. |
| 2006/0236371 A1 | 10/2006 | Fish |
| 2006/0248359 A1 | 11/2006 | Fung |
| 2006/0259734 A1 | 11/2006 | Sheu et al. |
| 2006/0265609 A1 | 11/2006 | Fung |
| 2007/0006001 A1 | 1/2007 | Isobe et al. |
| 2007/0047195 A1 | 3/2007 | Merkin et al. |
| 2007/0076653 A1 | 4/2007 | Park et al. |
| 2007/0081315 A1 | 4/2007 | Mondor et al. |
| 2007/0094486 A1 | 4/2007 | Moore et al. |
| 2007/0109968 A1 | 5/2007 | Hussain et al. |
| 2007/0130397 A1 | 6/2007 | Tsu |
| 2007/0174390 A1 | 7/2007 | Silvain et al. |
| 2007/0180310 A1 | 8/2007 | Johnson et al. |
| 2007/0209072 A1 | 9/2007 | Chen |
| 2007/0226795 A1 | 9/2007 | Conti et al. |
| 2007/0280230 A1 | 12/2007 | Park |
| 2007/0286009 A1 | 12/2007 | Norman |
| 2007/0288585 A1 | 12/2007 | Sekiguchi et al. |
| 2008/0013453 A1 | 1/2008 | Chiang et al. |
| 2008/0040463 A1 | 2/2008 | Brown et al. |
| 2008/0052437 A1 | 2/2008 | Loffink et al. |
| 2008/0059782 A1 | 3/2008 | Kruse et al. |
| 2008/0075089 A1 | 3/2008 | Evans et al. |
| 2008/0089358 A1 | 4/2008 | Basso et al. |
| 2008/0104264 A1 | 5/2008 | Duerk et al. |
| 2008/0140771 A1 | 6/2008 | Vass et al. |
| 2008/0140930 A1 | 6/2008 | Hotchkiss |
| 2008/0159745 A1 | 7/2008 | Segal |
| 2008/0162691 A1 | 7/2008 | Zhang et al. |
| 2008/0183882 A1 | 7/2008 | Flynn et al. |
| 2008/0186965 A1 | 8/2008 | Zheng et al. |
| 2008/0199133 A1 | 8/2008 | Takizawa et al. |
| 2008/0212273 A1 | 9/2008 | Bechtolsheim |
| 2008/0212276 A1 | 9/2008 | Bottom et al. |
| 2008/0217021 A1 | 9/2008 | Lembcke et al. |
| 2008/0222434 A1 | 9/2008 | Shimizu et al. |
| 2008/0235443 A1 | 9/2008 | Chow et al. |
| 2008/0239649 A1 | 10/2008 | Bradicich et al. |
| 2008/0243634 A1 | 10/2008 | Dworkin et al. |
| 2008/0250181 A1 | 10/2008 | Li et al. |
| 2008/0259555 A1 | 10/2008 | Bechtolsheim et al. |
| 2008/0259788 A1 | 10/2008 | Wang et al. |
| 2008/0266793 A1 | 10/2008 | Lee |
| 2008/0270599 A1 | 10/2008 | Tamir et al. |
| 2008/0288660 A1 | 11/2008 | Balasubramanian et al. |
| 2008/0288664 A1 | 11/2008 | Pettey et al. |
| 2008/0288683 A1 | 11/2008 | Ramey |
| 2008/0301379 A1* | 12/2008 | Pong .......... G06F 12/0284 711/148 |
| 2008/0301794 A1 | 12/2008 | Lee |
| 2008/0310848 A1 | 12/2008 | Yasuda et al. |
| 2008/0313369 A1 | 12/2008 | Verdoorn et al. |
| 2008/0320161 A1 | 12/2008 | Maruccia et al. |
| 2009/0021907 A1 | 1/2009 | Mann et al. |
| 2009/0044036 A1 | 2/2009 | Merkin |
| 2009/0063443 A1 | 3/2009 | Arimilli et al. |
| 2009/0064287 A1 | 3/2009 | Bagepalli et al. |
| 2009/0080428 A1 | 3/2009 | Witkowski et al. |
| 2009/0097200 A1 | 4/2009 | Sharma et al. |
| 2009/0113130 A1 | 4/2009 | He et al. |
| 2009/0133129 A1 | 5/2009 | Jeong et al. |
| 2009/0135751 A1 | 5/2009 | Hodges et al. |
| 2009/0135835 A1 | 5/2009 | Gallatin et al. |
| 2009/0158070 A1 | 6/2009 | Gruendler |
| 2009/0172423 A1 | 7/2009 | Song et al. |
| 2009/0198958 A1 | 8/2009 | Arimilli et al. |
| 2009/0204834 A1 | 8/2009 | Hendin et al. |
| 2009/0204837 A1 | 8/2009 | Raval et al. |
| 2009/0216920 A1 | 8/2009 | Lauterbach et al. |
| 2009/0219827 A1 | 9/2009 | Chen et al. |
| 2009/0222884 A1 | 9/2009 | Shaji et al. |
| 2009/0225751 A1 | 9/2009 | Koenck et al. |
| 2009/0235104 A1 | 9/2009 | Fung |
| 2009/0248943 A1 | 10/2009 | Jiang et al. |
| 2009/0251867 A1 | 10/2009 | Sharma et al. |
| 2009/0259863 A1 | 10/2009 | Williams et al. |
| 2009/0259864 A1 | 10/2009 | Li et al. |
| 2009/0265045 A1 | 10/2009 | Coxe, III |
| 2009/0271656 A1 | 10/2009 | Yokota et al. |
| 2009/0276666 A1 | 11/2009 | Haley et al. |
| 2009/0279518 A1 | 11/2009 | Falk et al. |
| 2009/0282274 A1 | 11/2009 | Langgood et al. |
| 2009/0282419 A1 | 11/2009 | Mejdrich et al. |
| 2009/0313390 A1 | 12/2009 | Ahuja et al. |
| 2010/0005331 A1 | 1/2010 | Somasundaram et al. |
| 2010/0008038 A1 | 1/2010 | Coglitore |
| 2010/0008365 A1 | 1/2010 | Porat |
| 2010/0026408 A1 | 2/2010 | Shau |
| 2010/0040053 A1 | 2/2010 | Gottumukkula et al. |
| 2010/0049822 A1 | 2/2010 | Davies et al. |
| 2010/0051391 A1 | 3/2010 | Jahkonen |
| 2010/0106987 A1 | 4/2010 | Lambert et al. |
| 2010/0118880 A1 | 5/2010 | Kunz et al. |

(56) References Cited

U.S. PATENT DOCUMENTS

| | | |
|---|---|---|
| 2010/0125742 A1 | 5/2010 | Ohtani |
| 2010/0125915 A1 | 5/2010 | Hall et al. |
| 2010/0138481 A1 | 6/2010 | Behrens |
| 2010/0158005 A1 | 6/2010 | Mukhopadhyay et al. |
| 2010/0161909 A1 | 6/2010 | Nation et al. |
| 2010/0165983 A1 | 7/2010 | Aybay et al. |
| 2010/0169479 A1 | 7/2010 | Jeong et al. |
| 2010/0198972 A1 | 8/2010 | Umbehocker |
| 2010/0198985 A1 | 8/2010 | Kanevsky et al. |
| 2010/0218194 A1 | 8/2010 | Dallman et al. |
| 2010/0220732 A1 | 9/2010 | Hussain et al. |
| 2010/0250914 A1 | 9/2010 | Abdul et al. |
| 2010/0265650 A1 | 10/2010 | Chen et al. |
| 2010/0281246 A1 | 11/2010 | Bristow et al. |
| 2010/0299548 A1 | 11/2010 | Chadirchi et al. |
| 2010/0308897 A1 | 12/2010 | Evoy et al. |
| 2010/0312910 A1 | 12/2010 | Lin et al. |
| 2010/0312969 A1 | 12/2010 | Yamazaki et al. |
| 2010/0318812 A1 | 12/2010 | Auradkar et al. |
| 2011/0023104 A1 | 1/2011 | Franklin |
| 2011/0026397 A1 | 2/2011 | Saltsidis et al. |
| 2011/0029652 A1 | 2/2011 | Chhuor et al. |
| 2011/0058573 A1 | 3/2011 | Balakavi et al. |
| 2011/0075369 A1 | 3/2011 | Sun et al. |
| 2011/0090633 A1 | 4/2011 | Rabinovitz |
| 2011/0103391 A1 | 5/2011 | Davis et al. |
| 2011/0113115 A1 | 5/2011 | Chang et al. |
| 2011/0119344 A1 | 5/2011 | Eustis |
| 2011/0123014 A1 | 5/2011 | Smith |
| 2011/0138046 A1 | 6/2011 | Bonnier et al. |
| 2011/0173612 A1 | 7/2011 | El Zur et al. |
| 2011/0185370 A1 | 7/2011 | Tamir et al. |
| 2011/0191514 A1 | 8/2011 | Wu et al. |
| 2011/0191610 A1 | 8/2011 | Agarwal et al. |
| 2011/0197012 A1 | 8/2011 | Liao et al. |
| 2011/0210975 A1 | 9/2011 | Wong et al. |
| 2011/0239014 A1 | 9/2011 | Karnowski |
| 2011/0271159 A1 | 11/2011 | Ahn et al. |
| 2011/0273840 A1 | 11/2011 | Chen |
| 2011/0295991 A1 | 12/2011 | Aida |
| 2011/0296141 A1 | 12/2011 | Daffron |
| 2011/0307887 A1 | 12/2011 | Huang et al. |
| 2011/0320690 A1 | 12/2011 | Petersen et al. |
| 2012/0011500 A1 | 1/2012 | Faraboschi et al. |
| 2012/0020207 A1 | 1/2012 | Corti et al. |
| 2012/0050981 A1 | 3/2012 | Xu et al. |
| 2012/0054469 A1 | 3/2012 | Ikeya et al. |
| 2012/0054511 A1 | 3/2012 | Brinks et al. |
| 2012/0081850 A1 | 4/2012 | Regimbal et al. |
| 2012/0096211 A1 | 4/2012 | Davis et al. |
| 2012/0099265 A1 | 4/2012 | Reber |
| 2012/0131201 A1 | 5/2012 | Matthews et al. |
| 2012/0155168 A1 | 6/2012 | Kim et al. |
| 2012/0198252 A1 | 8/2012 | Kirschtein et al. |
| 2012/0207165 A1 | 8/2012 | Davis |
| 2012/0297042 A1 | 11/2012 | Davis et al. |
| 2013/0010639 A1 | 1/2013 | Armstrong et al. |
| 2013/0024645 A1 | 1/2013 | Cheriton et al. |
| 2013/0031331 A1 | 1/2013 | Cheriton et al. |
| 2013/0058250 A1 | 3/2013 | Casado et al. |
| 2013/0094499 A1 | 4/2013 | Davis et al. |
| 2013/0097448 A1 | 4/2013 | Davis et al. |
| 2013/0111107 A1 | 5/2013 | Chang et al. |
| 2013/0148667 A1 | 6/2013 | Hama et al. |
| 2013/0163605 A1 | 6/2013 | Chandra et al. |
| 2013/0275703 A1 | 10/2013 | Schenfeld et al. |
| 2013/0290643 A1 | 10/2013 | Lim et al. |
| 2013/0290650 A1 | 10/2013 | Chang et al. |
| 2013/0318269 A1 | 11/2013 | Dalal et al. |
| 2014/0122833 A1 | 5/2014 | Davis et al. |
| 2014/0359044 A1 | 12/2014 | Davis et al. |
| 2014/0365596 A1 | 12/2014 | Kanevsky et al. |
| 2015/0039840 A1 | 2/2015 | Chandra et al. |
| 2015/0103826 A1 | 4/2015 | Davis |
| 2016/0161909 A1 | 6/2016 | Wada |

FOREIGN PATENT DOCUMENTS

| | | |
|---|---|---|
| JP | 2005-223753 A | 8/2005 |
| JP | 2005-536960 A | 12/2005 |
| TW | M377621 | 4/2010 |
| TW | 201017430 | 5/2010 |
| WO | WO-2004/021641 | 3/2004 |
| WO | WO-2005/013143 | 2/2005 |
| WO | WO-2008/000193 A1 | 1/2008 |
| WO | WO-2011/044271 | 4/2011 |
| WO | WO-2012/037494 | 3/2012 |

OTHER PUBLICATIONS

Chapter 1 Overview of the Origin Family Architecture from Origin and Onyx2 Theory of Operations Manual, published 1997, 18 pages.

Cisco MDS 9000 Family Multiprotocol Services Module, published 2006, 13 pages.

Comparing the I2C BUS to the SMBUS, Maxim Integrated, Dec. 1, 2000, p. 1.

Das et al., "Unifying Packet and Circuit Switched Networks," IEEE Globecom Workshops 2009, Nov. 30, 2009, pp. 1-6.

Deering, "IP Multicast Extensions for 4.3BSD UNIX and related Systems," Jun. 1999, 5 pages.

Elghany et al., "High Throughput High Performance NoC Switch," NORCHIP 2008, Nov. 2008, pp. 237-240.

Extended European Search Report for EP 10827330.1, dated Jun. 5, 2013.

Final Office Action on U.S. Appl. No. 12/889,721, dated Apr. 17, 2014.

Final Office Action on U.S. Appl. No. 15/281,462, dated Apr. 6, 2018.

Final Office Action on U.S. Appl. No. 13/234,054, dated Jan. 26, 2016.

Final Office Action on U.S. Appl. No. 13/692,741, dated Mar. 11, 2015.

Final Office Action on U.S. Appl. No. 12/794,996, dated Jun. 19, 2013.

Final Office Action on U.S. Appl. No. 12/889,721 dated Aug. 2, 2016.

Final Office Action on U.S. Appl. No. 12/889,721, dated May 22, 2015.

Final Office Action on U.S. Appl. No. 13/234,054 dated May 31, 2017.

Final Office Action on U.S. Appl. No. 13/234,054, dated Apr. 16, 2015.

Final Office Action on U.S. Appl. No. 13/475,713, dated Oct. 17, 2014.

Final Office Action on U.S. Appl. No. 13/475,722, dated Oct. 20, 2014.

Final Office Action on U.S. Appl. No. 13/527,498, dated Nov. 17, 2014.

Final Office Action on U.S. Appl. No. 13/527,505, dated Dec. 5, 2014.

Final Office Action on U.S. Appl. No. 13/624,725 dated Mar. 10, 2016.

Final Office Action on U.S. Appl. No. 13/624,725, dated Nov. 13, 2013.

Final Office Action on U.S. Appl. No. 13/624,731, dated Jul. 25, 2014.

Final Office Action on U.S. Appl. No. 13/662,759, dated Feb. 22, 2016.

Final Office Action on U.S. Appl. No. 13/705,340, dated Aug. 2, 2013.

Final Office Action on U.S. Appl. No. 13/705,414, dated Aug. 9, 2013.

Final Office Action on U.S. Appl. No. 13/728,428 dated May 6, 2016.

Final Office Action on U.S. Appl. No. 14/052,723, dated Dec. 3, 2015.

Final Office Action on U.S. Appl. No. 14/106,697 dated Feb. 2, 2016.

(56) References Cited

OTHER PUBLICATIONS

Final Office Action on U.S. Appl. No. 14/106,698, dated Aug. 19, 2015.
Final Office Action on U.S. Appl. No. 14/334,178, dated Nov. 4, 2015.
Final Office Action on U.S. Appl. No. 14/334,931, dated Jul. 9, 2015.
Final Office Action on U.S. Appl. No. 14/809,723 dated Aug. 25, 2017.
Final Office Action on U.S. Appl. No. 15/281,462 dated Jun. 13, 2017.
Final Office Action on U.S. Appl. No. 15/357,332 dated May 9, 2018.
Final Office Action on U.S. Appl. No. 13/624,731, dated Nov. 12, 2013.
fpga4fun.com,"What is JTAG?", 2 pages, Jan. 31, 2010.
From AT to BTX: Motherboard Form Factor, Webopedia, Apr. 29, 2005, p. 1.
Grecu et al., "A Scalable Communication-Centric SoC Interconnect Architecture" Proceedings 5th International Symposium on Quality Electronic Design, 2005, pp. 343, 348 (full article included).
Hossain et al., "Extended Butterfly Fat Tree Interconnection (EFTI) Architecture for Network on CHIP," 2005 IEEE Pacific Rim Conference on Communicatinos, Computers and Signal Processing, Aug. 2005, pp. 613-616.
HP ProLiant SL6500 Scalable System, Family data sheet, HP Technical sheet, Sep. 2010 4 pages.
HP Virtual Connect Traffic Flow—Technology brief, Jan. 2012, 22 pages.
International Preliminary Report on Patentability issued on PCT/US12/62608, dated May 6, 2014.
International Search Report and Written Opinion for PCT/US12/38987, dated Aug. 16, 2012.
International Search Report and Written Opinion for PCT/US12/61747, dated Mar. 1, 2013.
International Search Report and Written Opinion for PCT/US12/62608, dated Jan. 18, 2013.
International Search Report and Written Opinion for PCT/US2010/053227, dated May 10, 2012.
International Search Report and Written Opinion for PCT/US2011/051996, dated Jan. 19, 2012.
International Search Report and Written Opinion on PCT/US09/44200, dated Jul. 1, 2009.
International Search Report and Written Opinion on PCT/US2012/038986, dated Mar. 14, 2013.
Jansen et al., "SATA-IO to Develop Specification for Mini Interface Connector" Press Release Sep. 21, 2009, Serial ATA3 pages.
Nawathe et al., "Implementation of an 8-Core, 64-Thread, Power Efficient SPARC Server on a Chip", IEEE Journal of Solid-State Circuits, vol. 43, No. 1, Jan. 2008, pp. 6-20.
Non-Final Action on U.S. Appl. No. 13/728,362, dated Feb. 21, 2014.
Non-Final Office Action on U.S. Appl. No. 15/281,462 dated Feb. 10, 2017.
Non-Final Office Action on U.S. Appl. No. 15/254,111 dated Jun. 20, 2017.
Non-Final Office Action on U.S. Appl. No. 14/334,178 dated Dec. 18, 2015.
Non-Final Office Action on U.S. Appl. No. 12/889,721, dated Feb. 24, 2016.
Non-Final Office Action on U.S. Appl. No. 12/889,721, dated Jul. 2, 2013.
Non-Final Office Action on U.S. Appl. No. 13/475,722, dated Jan. 17, 2014.
Non-Final Office Action on U.S. Appl. No. 12/794,996, dated Sep. 17, 2012.
Non-Final Office Action on U.S. Appl. No. 12/889,721, dated Oct. 11, 2012.
Non-Final Office Action on U.S. Appl. No. 12/889,721, dated Sep. 29, 2014.
Non-Final Office Action on U.S. Appl. No. 13/234,054 dated Oct. 20, 2016.
Non-Final Office Action on U.S. Appl. No. 13/234,054, dated Oct. 23, 2014.
Non-Final Office Action on U.S. Appl. No. 13/234,054, dated Aug. 6, 2015.
Non-Final Office Action on U.S. Appl. No. 13/284,855, dated Dec. 19, 2013.
Non-Final Office Action on U.S. Appl. No. 13/453,086, dated Mar. 12, 2013.
Non-Final Office Action on U.S. Appl. No. 13/475,713, dated Apr. 1, 2014.
Non-Final Office Action on U.S. Appl. No. 13/527,505, dated May 8, 2014.
Non-Final Office Action on U.S. Appl. No. 13/527,498, dated May 8, 2014.
Non-Final Office Action on U.S. Appl. No. 13/624,725, dated Jan. 10, 2013.
Non-Final Office Action on U.S. Appl. No. 13/624,725, dated Apr. 23, 2015.
Non-final office action on U.S. Appl. No. 13/624,731 dated Jan. 29, 2013.
Non-Final Office Action on U.S. Appl. No. 13/662,759, dated Nov. 6, 2014.
Non-Final Office Action on U.S. Appl. No. 13/692,741, dated Sep. 4, 2014.
Non-Final Office Action on U.S. Appl. No. 13/692,741, dated Jul. 1, 2015.
Non-Final Office Action on U.S. Appl. No. 13/705,286, dated May 13, 2013.
Non-Final Office Action on U.S. Appl. No. 13/705,340, dated Mar. 12, 2014.
Non-Final Office Action on U.S. Appl. No. 13/705,340, dated Mar. 29, 2013.
Non-Final Office Action on U.S. Appl. No. 13/705,414, dated Apr. 9, 2013.
Non-Final Office Action on U.S. Appl. No. 13/728,308, dated May 14, 2015.
Non-Final Office Action on U.S. Appl. No. 13/728,428, dated Jun. 12, 2015.
Non-Final Office Action on U.S. Appl. No. 14/052,723, dated May 1, 2015.
Non-Final Office Action on U.S. Appl. No. 14/106,697, dated Aug. 17, 2015.
Non-Final Office Action on U.S. Appl. No. 14/106,698, dated Feb. 12, 2015.
Non-Final Office Action on U.S. Appl. No. 14/334,931, dated Jan. 5, 2015.
Non-Final Office Action on U.S. Appl. No. 14/725,543 dated Apr. 7, 2016.
Non-Final Office Action on U.S. Appl. No. 14/753,948 dated Nov. 4, 2016.
Non-Final Office Action on U.S. Appl. No. 14/809,723 dated Dec. 30, 2016.
Non-Final Office Action on U.S. Appl. No. 15/042,489 dated Jan. 9, 2018.
Non-Final Office Action on U.S. Appl. No. 15/078,115 dated Sep. 5, 2017.
Non-Final Office Action on U.S. Appl. No. 15/270,418 dated Apr. 21, 2017.
Non-Final Office Action on U.S. Appl. No. 15/281,462 dated Dec. 15, 2017.
Non-Final Office Action on U.S. Appl. No. 15/357,332 dated Nov. 9, 2017.
Non-Final Office Action on U.S. Appl. No. 13/705,428, dated Jul. 10, 2013.
Non-Final Office Action on U.S. Appl. No. 14/334,931 dated Dec. 11, 2015.
Notice of Allowance issued on U.S. Appl. No. 14/052,723, dated Feb. 8, 2017.
Notice of Allowance on U.S. Appl. No. 14/334,931 dated May 20, 2016.

(56) References Cited

OTHER PUBLICATIONS

Notice of Allowance on U.S. Appl. No. 13/234,054, dated Sep. 19, 2017.
Notice of Allowance on U.S. Appl. No. 13/453,086, dated Jul. 18, 2013.
Notice of Allowance on U.S. Appl. No. 13/475,713, dated Feb. 5, 2015.
Notice of Allowance on U.S. Appl. No. 13/475,722, dated Feb. 27, 2015.
Notice of Allowance on U.S. Appl. No. 13/527,498, dated Feb. 23, 2015.
Notice of Allowance on U.S. Appl. No. 13/527,505, dated Mar. 6, 2015.
Notice of Allowance on U.S. Appl. No. 13/624,725, dated Mar. 30, 2016.
Notice of Allowance on U.S. Appl. No. 13/624,731, dated Mar. 5, 2015.
Notice of Allowance on U.S. Appl. No. 13/705,340, dated Dec. 3, 2014,
Notice of Allowance on U.S. Appl. No. 13/705,386, dated Jan. 24, 2014.
Notice of Allowance on U.S. Appl. No. 13/705,414, dated Nov. 4, 2013.
Notice of Allowance on U.S. Appl. No. 13/728,428 dated Jul. 18, 2016.
Notice of Allowance on U.S. Appl. No. 14/106,697 dated Oct. 24, 2016.
Notice of Allowance on U.S. Appl. No. 14/725,543 dated Jul. 21, 2016.
Notice of Allowance on U.S. Appl. No. 14/753,948 dated Jun. 14, 2017.
Notice of Allowance on U.S. Appl. No. 14/809,723 dated Jan. 11, 2018.
Notice of Allowance on U.S. Appl. No. 15/078,115 dated Jan. 8, 2018.
Notice of Allowance on U.S. Appl. No. 15/254,111 dated Sep. 1, 2017.
Notice of Allowance on U.S. Appl. No. 15/270,418 dated Nov. 2, 2017.
Notice of Allowance on U.S. Appl. No. 15/360,668 dated May 5, 2017.
Notice of Allowance on U.S. Appl. No. 15/430,959 dated Mar. 15, 2018.
Notice of Allowance on U.S. Appl. No. 15/672,418 dated Apr. 4, 2018.
Notice of Allowance on U.S. Appl. No. 13/284,855, dated Jul. 14, 2014.
Notice of Allowance on U.S. Appl. No. 15/042,489 dated Jul. 16, 2018.
Notice of Allowance on U.S. Appl. No. 15/357,332 dated Jul. 12, 2018.
Notice of Allowance on U.S. Appl. No. 13/662,759 dated May 10, 2016.
Notice of Allowance on U.S. Appl. No. 13/692,741 dated Dec. 4, 2015.
Notice of Allowance on U.S. Appl. No. 14/334,178 dated Jun. 8, 2016.
Notice of Allowance U.S. Appl. No. 13/728,308, dated Oct. 7, 2015.
Office Action on Taiwan Application 100133390, dated Aug. 25, 2015 (English translation not available).
Office Action on Taiwan Application 101139729, dated May 25, 2015 (English translation not available).
Pande et al.,j "Design of a Switch for Network on Chip Applications," May 25-28, 2003 Proceedings of the 2003 International Symposium on Circuits and Systems, vol. 5, pp. V217-V220.
Reexamination Report on Japanese Application 2012-536877, dated Jan. 22, 2015 (English Translation not available).
Search Report on EP Application 10827330.1, dated Feb. 12, 2015.
U.S. Notice of Allowance on U.S. Appl. No. 13/705,340 dated Mar. 16, 2015.
U.S. Notice of Allowance on U.S. Appl. No. 14/052,723 dated Feb. 8, 2017.
U.S. Notice of Allowance on U.S. Appl. No. 14/334,178 dated Aug. 19, 2016.
U.S. Notice of Allowance on U.S. Appl. No. 15/254,111 dated Nov. 13, 2017.
Venaas, "IPv4 Multicast Address Space Registry," 2013, http://www.iana.org/assignments/multicast-addresses/multicast-addresses.xhtml.
International Preliminary Report on Patentability for PCT/US2009/044200, dated Nov. 17, 2010.
International Preliminary Report on Patentability for PCT/US2010/053227, dated Dec. 16, 2010.
International Preliminary Report on Patentability for PCT/US2012/038986 dated Nov. 26, 2013.
International Preliminary Report on Patentability for PCT/US2012/061747, dated Apr. 29, 2014.
International Preliminary Report on Patentability for PCT/US2012/062608, dated May 6, 2014.
International Search Report and Written Opinion for PCT/US2012/038987, dated Aug. 16, 2012.
Final Office Action on U.S. Appl. No. 13/624,725, dated Nov. 4, 2015.

\* cited by examiner

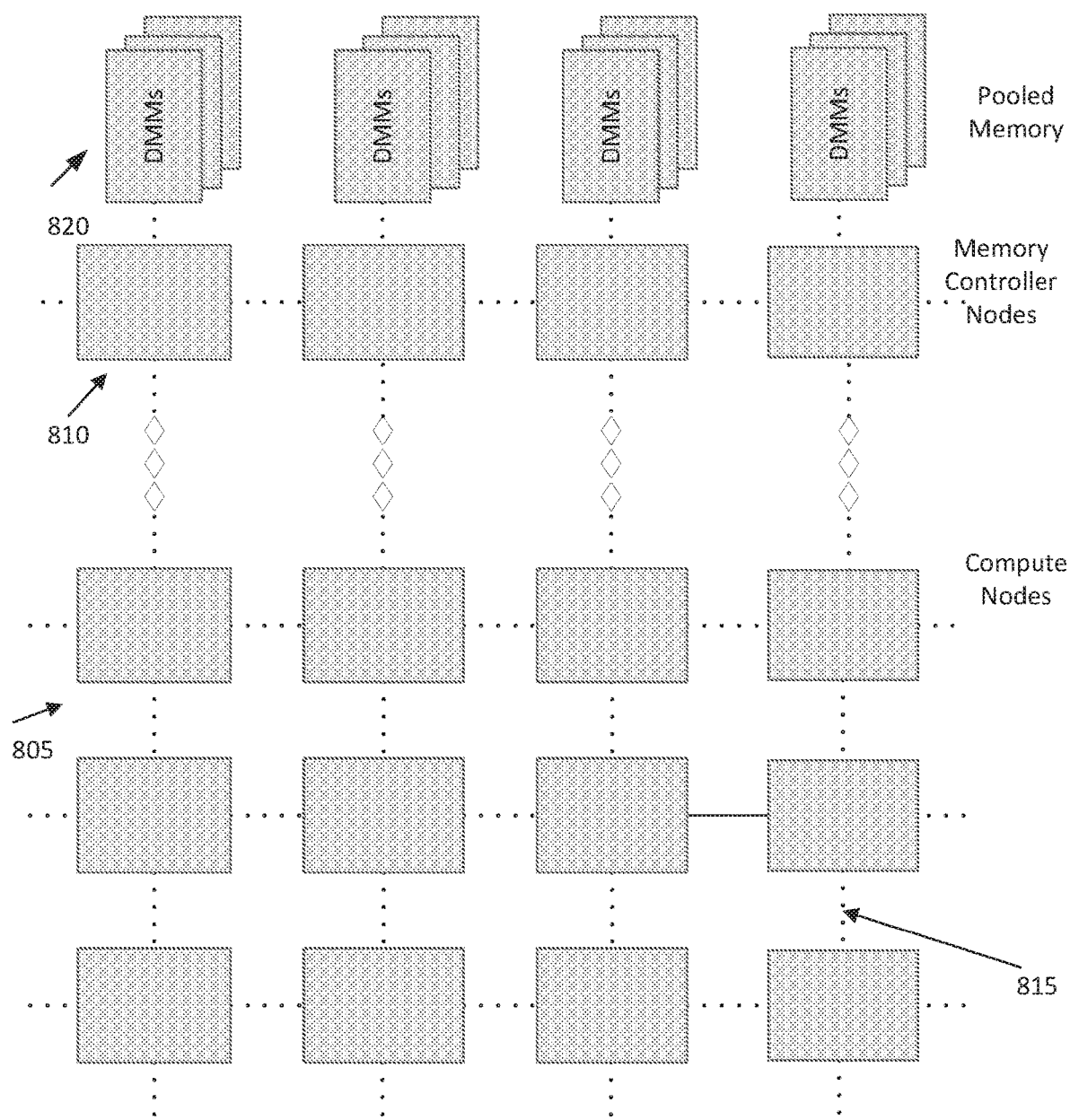

MEMCACHED SERVER FUNCTIONALITY IN A CLUSTER OF DATA PROCESSING NODES

CROSS REFERENCE TO RELATED APPLICATIONS

The present application is a continuation of U.S. application Ser. No. 15/357,332, filed Nov. 21, 2016, which is a continuation of U.S. application Ser. No. 13/728,428, filed Dec. 27, 2012, which is a continuation-in-part of U.S. application Ser. No. 13/453,086 filed Apr. 23, 2012, which is a continuation-in-part of U.S. application Ser. No. 12/794,996 filed Jun. 7, 2010 which claims priority to U.S. Provisional Application No. 61/256,723 filed Oct. 30, 2009, all of these applications having a common applicant herewith and being incorporated herein in their entirety by reference.

BACKGROUND

1. Field of the Invention

The embodiments of the present invention relate to allocation and disassociation of disparate computing resources of clustered computing nodes. More specifically, embodiments of the present invention relate to systems and methods for providing memcached server functionality in a cluster of data processing nodes such as for allowing access to cached information from one or more data processing nodes within a cluster of data processing nodes.

2. Description of Related Art

Conventionally, network systems used different topologies, e.g. Ethernet architecture employed a spanning tree type of topology. Recently, Ethernet fabric topology has been developed that provides a higher level of performance, utilization, availability and simplicity. Such Ethernet fabric topologies are flatter and self-aggregating in part because of the use of intelligent switches in the fabric that are aware of the other switches and can find shortest paths without loops. One benefit is that Ethernet fabric topologies are scalable with high performance and reliability. Ethernet fabric data center architectures are available from Juniper, Avaya, Brocade, and Cisco.

A "shared nothing architecture" is a distributed computing architecture in which each node is independent and self-sufficient. Typically, none of the nodes share memory or disk storage. A shared nothing architecture is popular for web development because of its scalability. What is deficient in typical shared nothing clusters is the ability to allow memory capacity to be provisioned based on workload on a per-node basis, to implement memcached functionality on a per-node basis across a plurality of nodes in a cluster, to load/store from remote memory, to perform remote DMA transactions, and to perform remote interrupts.

SUMMARY

The system and method of the present invention provide flexible methods of extending these distributed network systems beyond the typical shared nothing cluster to accommodate different protocols in varying network topologies. The systems and methods hereof provide the ability to load/store from remote memory, implement memcached functionality on a per-node basis across a plurality of nodes in a cluster, perform remote DMA transactions, perform remote interrupts, allow a wide range of use cases that greatly extend performance, power optimization, and functionality of shared nothing clusters. Several examples are described which include network acceleration, storage acceleration, message acceleration, and shared memory windows across a power-optimized interconnect multi-protocol fabric.

In one embodiment, a method is performed by a first server on a chip (SoC) node that is one instance of a plurality of nodes within a cluster of nodes. The method comprises a plurality of operations. An operation is performed for determine if a second one of the SoC nodes in the cluster has data stored thereon corresponding to a data identifier in response to receiving a data retrieval request including the data identifier. An operation is performed for determining if a remote memory access channel exists between the SoC node and the second one of the SoC nodes. An operation is performed for access the data from the second one of the SoC nodes using the remote memory access channel after determine that the second one of the SoC nodes has the data stored thereon and that the remote memory access channel exists between the SoC node and the second one of the SoC nodes. The operations can be performed by one or more processors that access, from memory allocated or otherwise accessible to the one or more processors, instructions that embody the operations and that are processible by the one or more processors.

In another embodiment, a non-transitory computer-readable medium has tangibly embodied thereon and accessible therefrom a set of instructions interpretable by one or more data processing devices of a first SoC node in a cluster of SoC nodes. The set of instructions is configured for causing the one or more data processing devices to implement operations for determining if a second SoC node in the cluster has data stored thereon corresponding to a data identifier, determining if a remote memory access channel exists between the first SoC node and the second SoC node, and accessing the data from the second SoC node using the remote memory access channel after determining that the second SoC node has data stored thereon and that the remote memory access channel exists between the first and second SoC nodes.

In another embodiment, a data processing system comprises a first server on a chip (SoC) node characterized by a SoC node density configuration enabling the second SoC node to serve in a role of providing information computing resources to one or more data processing systems and a second SoC node characterized by a memory configuration enabling the second SoC node to serve in a role of enabling memory resources thereof to be allocated to one or more other SoC nodes. The first SoC node is coupled to the second SoC node by a remote memory access channel. One or more processors of the first SoC node is configured for accessing and processing instructions for causing the first SoC node to determine if the second SoC node has data stored thereon corresponding to a data identifier received by the first SoC node from a particular one of the one or more data processing systems. One or more processors of the second SoC node is configured for accessing and processing instructions for causing the second SoC node to provide the data stored thereon to the first SoC node using the respective remote memory access channel.

These and other objects, embodiments, advantages and/or distinctions of the present invention will become readily apparent upon further review of the following specification, associated drawings and appended claims.

BRIEF DESCRIPTION OF THE DRAWINGS

FIG. 8A is a diagram showing a node cluster architecture in accordance with one embodiment of the present invention.

DETAILED DESCRIPTION

Figure 1:
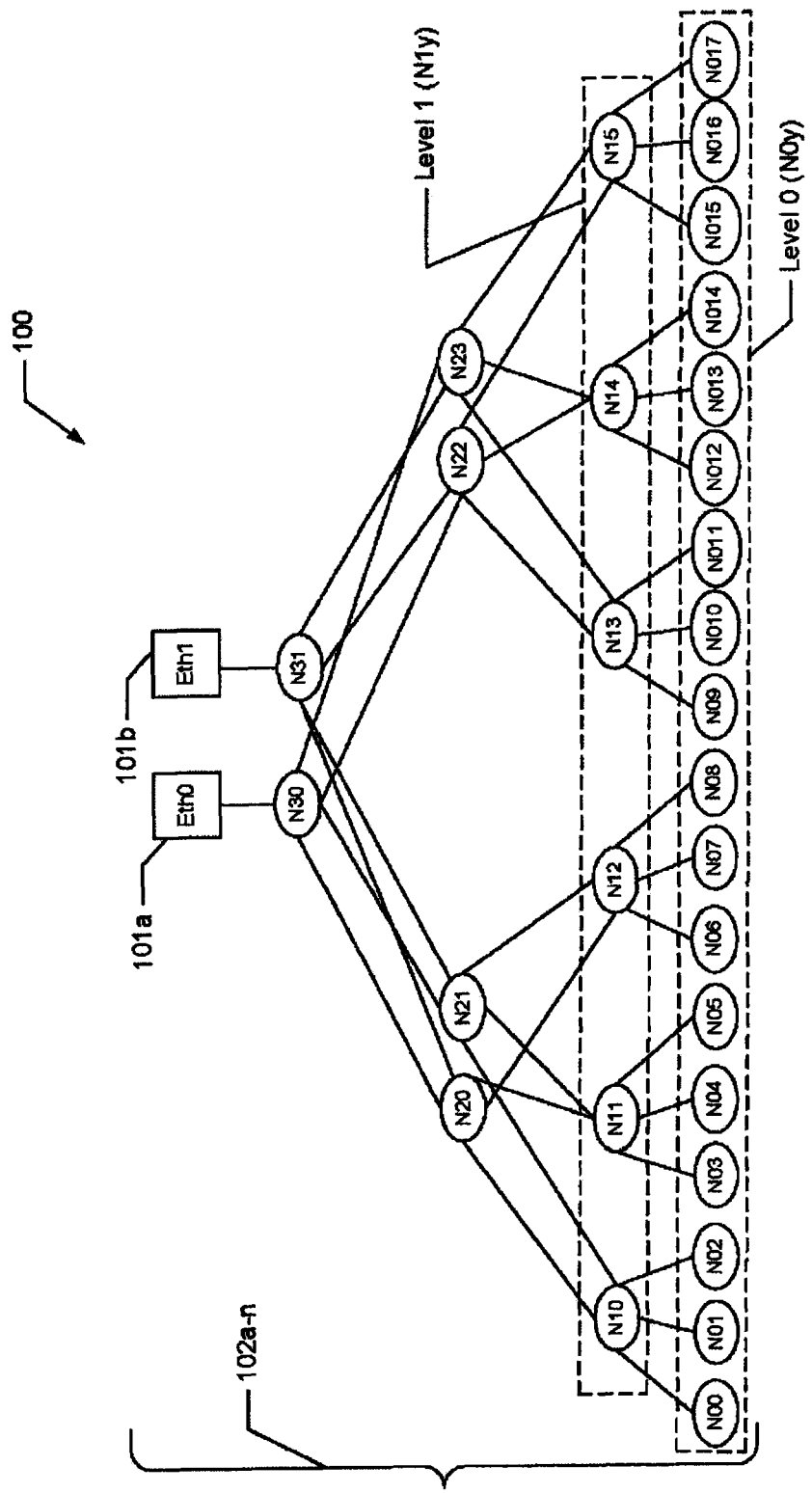
FIG. 1 is a high level diagram of a topology for a network system.

FIG. 1 shows an example of a high-level topology of a network system 100 that illustrates compute nodes connected by a switched interconnect fabric. Network ports 101a and 101b come from the top of the fabric to external network connectivity. These network ports are typically Ethernet, but other types of networking including Infiniband are possible. Hybrid nodes 102a-n are compute nodes that comprise both computational processors as well as a fabric packet switch. The hybrid nodes 102a-n have multiple interconnect links to comprise the distributed fabric interconnect (i.e., a node interconnect fabric that provides an inter-node communication channel between a plurality of SoC nodes).

A recommended implementation for the fabric interconnect is a high-speed SerDes interconnect, such as multi-lane XAUI. In the preferred solution, a four-lane XAUI interconnect is used. Each of the four lanes can also have the speed varied from 1 Gb/sec (SGMII), XAUI rate (3.125 Gb/sec), and double XAUI (6.25 Gb/sec). The actual number of lanes and variability of speeds of each lane are implementation specific, and not important to the described innovations. Other interconnect technologies can be used that have a means to adaptively change the effective bandwidth, by varying some combination of link speeds and widths. Power consumption of a link is usually related to the delivered bandwidth of the link. By reducing the delivered bandwidth of the link, either through link speed or width, the power consumption of the link can be reduced.

Related application Ser. No. 12/794,996 (incorporated by reference) describes the architecture of a power-optimized, high performance, scalable inter-processor communication fabric. FIG. 1 shows a high-level topology 100 of a network system, such as described in the '996 Related Application, that illustrates XAUI connected SoC nodes connected by the switching fabric. The 10 Gb Ethernet ports Eth0 101a and Eth1 101b come from the top of the tree. Most, if not all of the hybrid nodes 102a-n comprise both computational processors as well as an embedded switch as described below in conjunction with FIGS. 2-3. The hybrid nodes 102a-n have five XAUI links connected to the internal switch. The switching layers use all five XAUI links for switching. For example, as shown in FIG. 1, level 0 leaf nodes 102d, e (i.e., N0n nodes, or Nxy, where x=level and y=item number) only use one XAUI link to attach to the interconnect, leaving four high-speed ports that can be used as XAUI, 10 Gb Ethernet, PCIe, SATA, etc., for attachment to I/O. The vast majority of trees and fat tree-type network systems have active nodes only as leaf nodes, and the other nodes are pure switching nodes. This approach makes routing much more straightforward. Network system 100 has the flexibility to permit every hybrid node 102a-n to be a combination computational and switch node, or just a switch node. Most tree-type implementations have I/O on the leaf nodes, but system 100 lets the I/O be on any node. In general, placing the Ethernet at the top of the tree as at 101a/101b minimizes the average number of hops to the Ethernet.

In a preferred example, the hybrid nodes 102a-n shown in the tree-oriented topology of system 100 in FIG. 1 may represent independent nodes within a computing cluster. FIG. 1 illustrates one example implementation of individual nodes 102a-n of the cluster. When looking at a conventional implementation of a topology e.g. in FIG. 1, computing nodes are usually found in the lower level leaf nodes (e.g. N00-N017), and the upper level nodes do not have computing elements but are just network switching elements (N20-N31).

Figure 2:
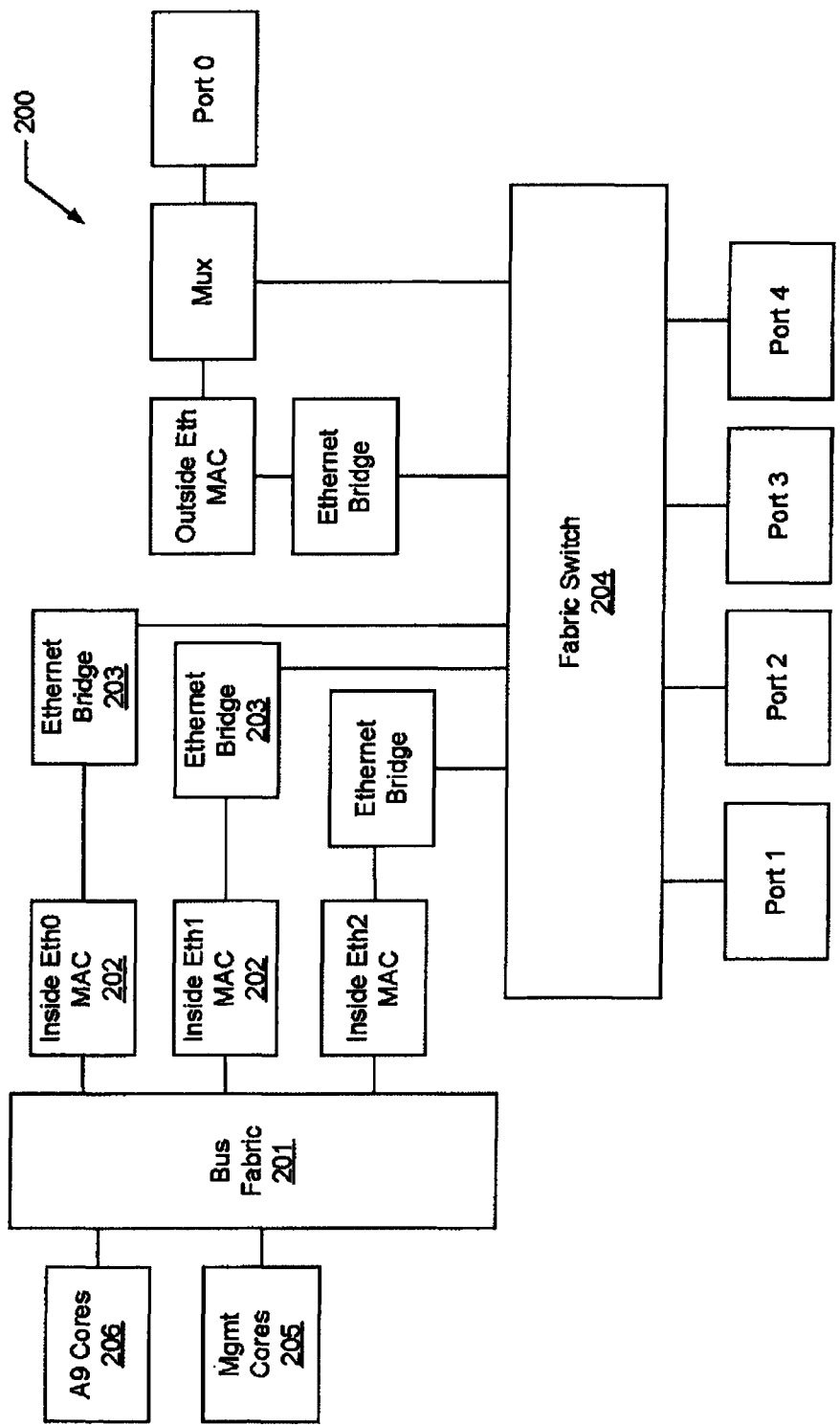
FIG. 2 is a block diagram of a network node in accordance with one embodiment of the present invention.

FIG. 2 illustrates one example of a "personality module" 200 in accordance with the present invention which is specifically designed for Ethernet protocol. Such an Ethernet personality module 200 can be used as a hybrid node for one or more of the nodes 102a-n of FIG. 1. With the node architecture shown in FIG. 2, the CPU Cores 206 of each personality module may be optionally enabled, or could be just left powered-off. With a personality module 200 used for the upper level switching nodes (N20-N30) in FIG. 1, the modules can be operated as pure switching elements (like traditional implementations), or the CPU Cores module 206 can be enabled and used as complete compute nodes within the computing cluster.

Note that the tree oriented interconnect fabric of FIG. 1 is simply one example of a type of server interconnect fabric. The concepts and inventions described herein have no dependency on the specific topology of interconnect fabric or protocol employed.

In more detail, the personality module 200 of FIG. 2 may be used as one or more of the hybrid nodes in the network system of FIG. 1. In FIG. 2, processors 205/206 communicate with the Ethernet MAC controllers 202 via the internal SOC processor bus fabric 201. Ethernet MAC controllers 202 generate Ethernet frames. The Ethernet Bridges 203 prepend a fabric routing header to the beginning of the Ethernet Frame. The Ethernet Bridges 203 contains the layer 2 Ethernet processing and computes the routing header based upon a distributed layer 2 Ethernet switch. A skilled person will appreciate that processors utilized in embodiments of the present invention (e.g., processors 205/206) are not unnecessarily limited to any particular model or brand of processor.

The Ethernet Bridges 203 in FIG. 2 receives an Ethernet frame from the Ethernet MAC controllers 202 in FIG. 2, sending an augmented routing frame to the fabric switch 204. Note that all frames that are flowing within the fabric are routing frames, not Ethernet frames. The Ethernet frame/routing frame conversion is done only as the packet is entering or leaving the fabric via a MAC. Note also that the routing logic within the switch may change fields within the routing frame. The Ethernet frame is never modified (except the adding/removing of the preamble, start of frame, and inter-frame gap fields).

The routing frame is composed of several fields providing sufficient data for the fabric switch 204 of FIG. 2 to make routing and security decisions without inspection of the underlying Ethernet frame which is considered an opaque payload. The resulting routing frame is thus a catenation of the routing frame header and the payload frame.

Related application Ser. No. 12/794,996 (incorporated by reference) disclosed in more detail an Ethernet protocol focused fabric switch. In the related '996 application two primary components are described:

An Ethernet Routing Header processor that inspects Ethernet frames, and adds/removes the fabric switch routing header.

The fabric switch that is responsible for transporting the packet between nodes by only using data from the routing header.

A key attribute of the Fabric Switch, 204 in FIG. 2, is that packets may be securely routed to their destination node/port by only using data in the routing header, without any inspection of the underlying data payload. Thus the data payload is considered opaque and invariant.

Figure 3:
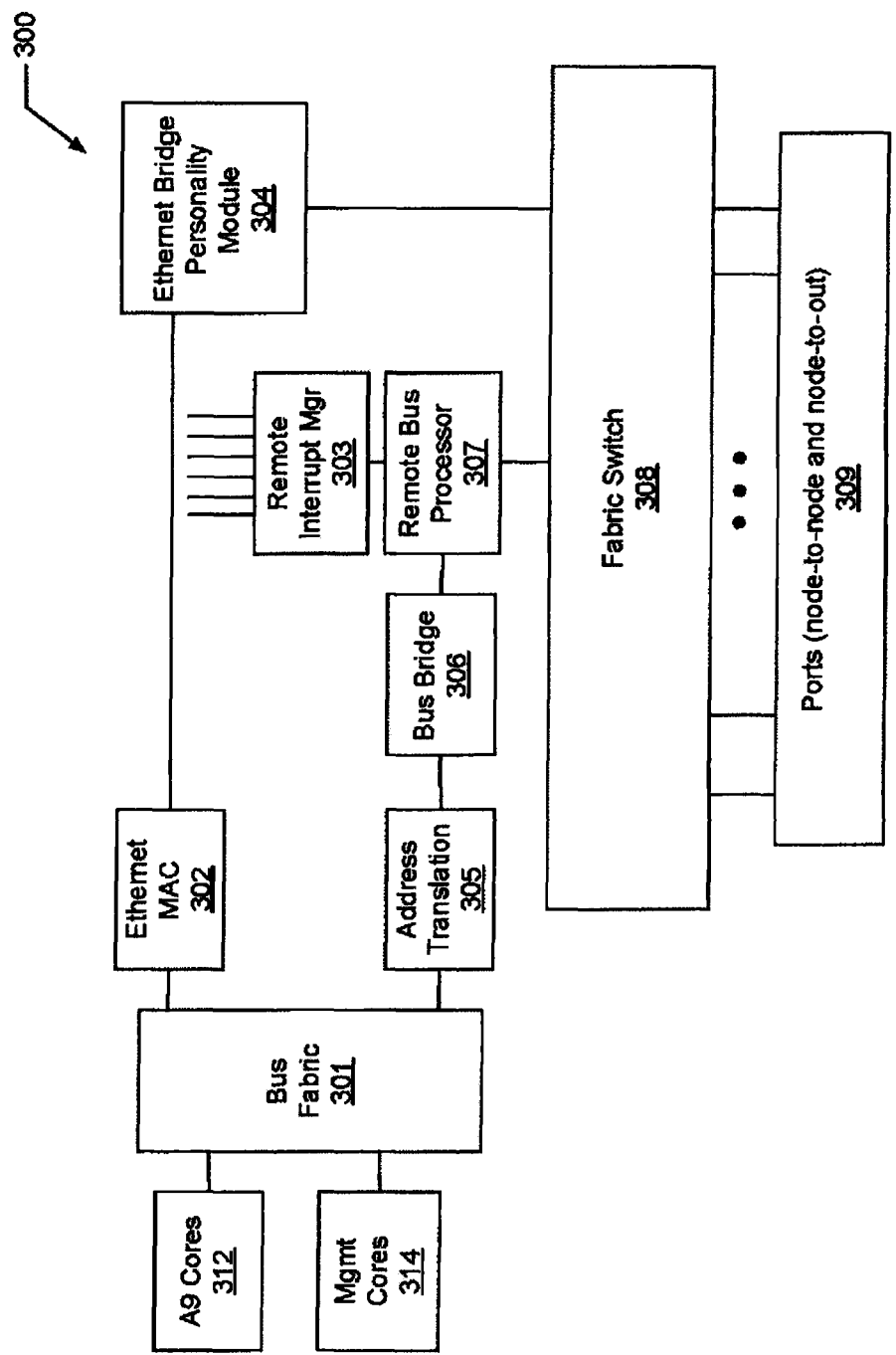
FIG. 3 is a block diagram of a network node in accordance with a second embodiment of the present invention.

FIG. 3 illustrates a preferred embodiment of a multi-protocol personality module 300 that is similar to the Ethernet protocol module of FIG. 2. The module of FIG. 3 is similar to the Ethernet fabric module of FIG. 2 in that it continues to be responsible for transporting packets between nodes by only using data from the routing header. However, the multi-protocol personality module 300 of FIG. 3 operates with multiple protocols to accommodate a network operating with different protocols. Protocol specific personality modules are added such that routing header processing is done in new and separate fabric personality modules that provide mappings from specific protocol semantics to fabric routing headers. The multi-protocol personality module 300 of FIG. 3, like the Ethernet module of FIG. 2, is responsible for adding a routing header for packets entering the fabric, and removing the routing header when packets are leaving the fabric. The routing header maintains in place as the packets are transported node to node across the fabric.

The multi-protocol personality module 300 of FIG. 3 includes a portion for processing Ethernet (302, 304) which function much like the module of FIG. 2, and a portion (e.g., components 303, 305, 306, 307) for allowing bus transactions to be transported across the fabric, offering the ability to remote memory, I/O, and interrupt transactions across the fabric. In some embodiments of the present invention, a Remote Bus Personality Module of the multi-protocol personality module 300 comprises the portion of the multi-protocol personality module 300 that allows bus transactions to be transported across the fabric thereby enabling the ability to remote memory, I/O, and interrupt transactions across the fabric. In this regard, the Remote Bus Personality Module enables functionality related to allowing bus transactions to be transported across the fabric thereby provides the ability to remote memory, I/O, and interrupt transactions across the fabric.

As can be seen from the block diagram of FIG. 3 depicting an exemplary multi-protocol module 300, the Fabric Switch 308 transports packets across nodes of inter-node fabric (i.e., an inter-node communication channel defined thereby) therebetween by inspection of only the routing header. The routing header is composed of several fields providing sufficient data for the fabric switch 308 to make routing and security decisions without inspection of the underlying opaque data payload. The resulting routing frame is thus a catenation of the routing frame header and the opaque payload frame. One example of a payload frame is an Ethernet frame. For example, as shown in Table 1 below, a routing frame might comprise:

TABLE 1

| Routing Frame Header | Ethernet Frame Packet | | | | |
|---|---|---|---|---|---|
| RF Header | MAC destination | MAC Source | Ethertype/ Length | Payload (data and padding) | CRC32 |

An example of a routing header follows in Table 2, but the fields may vary by implementation:

TABLE 2

| Field | Width (Bits) | Notes |
|---|---|---|
| Domain ID | 5 | Domain ID associated with this packet. 0 indicates that no domain has been specified. |
| Mgmt Domain | 1 | Specifies that the packet is allowed on the private management domain. |
| Source Node | 12 | Source node ID |
| Source Port | 2 | 0 = MAC0, 1 = MAC1, 2 = MAC_management processor, 3 = MAC OUT |
| Dest Node | 12 | Destination node ID |
| Dest Port | 2 | 0 = MAC0, 1 = MAC1, 2 = MAC_management processor, 3 = MAC OUT |
| RF Type | 2 | Routing Frame Type (0 = Unicast, 1 = Multicast, 2 = Neighbor Multicast, 3 = Link Directed) |
| TTL | 6 | Time to Live - # of hops that this frame has existed. Switch will drop packet if the TTL threshold is exceeded (and notify management processor of exception). |
| Broadcast ID | 5 | Broadcast ID for this source node for this broadcast packet. |
| Checksum | | Checksum of the frame header fields. |

Since the Fabric Switch 308 makes routing decisions by inspection of only the routing header, and the data payload frame is considered both opaque and invariant, these characteristics can be leveraged to create an extensible set of personality modules. A multi-protocol personality module 300 such as shown in FIG. 3 provides a mapping from specific protocols to add and remove the fabric routing headers for that protocol.

When using a personality module 300 such as shown in FIG. 3 as a hybrid node 102a-n in the system of FIG. 1, as previously stated, all frames that are flowing within the fabric are routing frames, not Ethernet frames. The payload frame/routing frame conversion is done only as the packet is entering or leaving the fabric. Note also that the routing logic within the switch may change fields within the routing frame. The payload frame is never modified.

The Ethernet Bridge personality processor 304 in FIG. 3, is functionally identical to the Routing Header processor in Related application Ser. No. 12/794,996, but generalized from a single-protocol processor (such as FIG. 2), to a module having a number of protocol processing portions. The Ethernet Bridge Processor 304 adds the routing header as the packet comes from the Ethernet MAC 302 to the fabric switch 308, and removes the routing header as the packet comes from the fabric switch 308 to the MAC 302.

Similar to FIG. 2, the processors 312/314 communicate with the Ethernet MAC controllers 302 in FIG. 3 via the internal SOC processor bus fabric 301. Ethernet MAC controllers 302 generate Ethernet frames. The Ethernet Bridge 304 prepends a fabric routing header to the beginning of the Ethernet Frame. The Ethernet Bridge 304 contains the layer 2 Ethernet processing and computes the routing header based upon a distributed layer 2 Ethernet switch.

As disclosed above in reference to the multi-protocol personality module 300 of FIG. 3, the Remote Bus Personality Module includes the Remote Interrupt Manager 303, the Remote Address translation module 305, the Bus Bridge 306 and the Remote Bus Processor 307. In FIG. 3, the Bus Fabric 301 represents the internal bus fabric of a system on a chip (SOC). As discussed below, the SoC can be configured to provide server functionality and thus be referred to as a server on a chip. This bus fabric carries CPU mastered load/store transactions to memory and I/O, as well as I/O mastered transactions, e.g. initiated by I/O DMA controllers.

The functionality of the Remote Bus personality Module consists of

The Remote Address translation module 305, which converts local addresses steered to the Remote Bus Personality Module (RBPM) to [Remote Node, Remote Node Address].

The Bus Bridge 306, which converts a processor bus of arbitrary address and data width into a packed, potentially multi-flit packet. In this regard, the Bus Bridge 306 converts a processor bus of arbitrary address and data width into packetized transfers across the fabric.

The Remote Bus Processor 307, which adds and removes the fabric routing header, transports bus packets from Bus Bridge 306 and interrupts from Remote Interrupt Manager 303 over the fabric in-order with guaranteed delivery.

The Remote Address translation module 305 converts local addresses steered to the RBFPM to [Remote Node, Remote Node Address]. This is depicted in more detail in FIG. 4 which shows that there is a set of mapping tables from [local address, size] to [Node ID, Remote address]. This address translation can be implemented as a custom module, typically leveraging a CAM (Content Addressable Memory). Alternatively, this stage may be implemented with a standard IP block of an I/O MMU (memory management unit) which translates the intermediate physical address in a bus transaction to a physical address. In this case, these translation tables are configured so that the resulting physical address encodes the [Remote Node ID, and Remote Address].

The Bus Bridge 306 of FIG. 3 functions to interface to and packetize the CPU/I/O bus transactions. In this regard, the Bus Bridge 306 can function as a packetizer. This Bus Bridge 306 is conceptually designed as having a layered model. In any given implementation, these layers may or may not be present, and will have tuned functionality for the bus bridging that is being implemented.

The multiple layer design of the Bus Bridge 306 is:
Transaction layer
    The Transaction layer performs any necessary transforms that understand multiple bus channels or that understand the semantics of the transaction.

Transfer layer (also known as Transport layer)
  The Transfer layer performs any necessary transforms within a channel related to the overall data transfer. This could include data compression.
Data Link layer
  The Data Link layer performs arbitration, multiplexing and packing of channels to a physical packet representation.
  Implements any necessary flow control.
Physical layer
  The Physical layer performs transformation and optimization of the physical packet representation to packet size, width, and flit requirements to the fabric switch implementation. This Physical layer and/or the Link layer may actually produce multiple flits corresponding to a single physical bus packet.

The Remote Bus Processor 307 functions in a similar manner to the Ethernet Bridge Personality Processor 304 to add and remove the fabric routing header and transport bus packets from 306 to the fabric switch 308. Additionally, the Remote Bus Processor 307 connects interrupts from Remote Interrupt Manager 303 over the fabric with guaranteed delivery.

Example 1: Distributed One-Sided Cache Coherent Shared Memory Across the Fabric

In FIG. 1, one or more of the compute nodes could constitute servers, and the fabric connects two or more servers. The ability to open up memory sharing windows in another server across the fabric enables a wide-range of new capabilities that are not possible in traditional "shared nothing" clusters. In this example, the form that a load or store bus transaction issued by Server Node A is targeting a physical address in Server Node B. Such bus transactions may originate from any bus master in Node A, including processors, I/O bus masters (such as a SATA controller), or a DMA engine.

Figure 4:
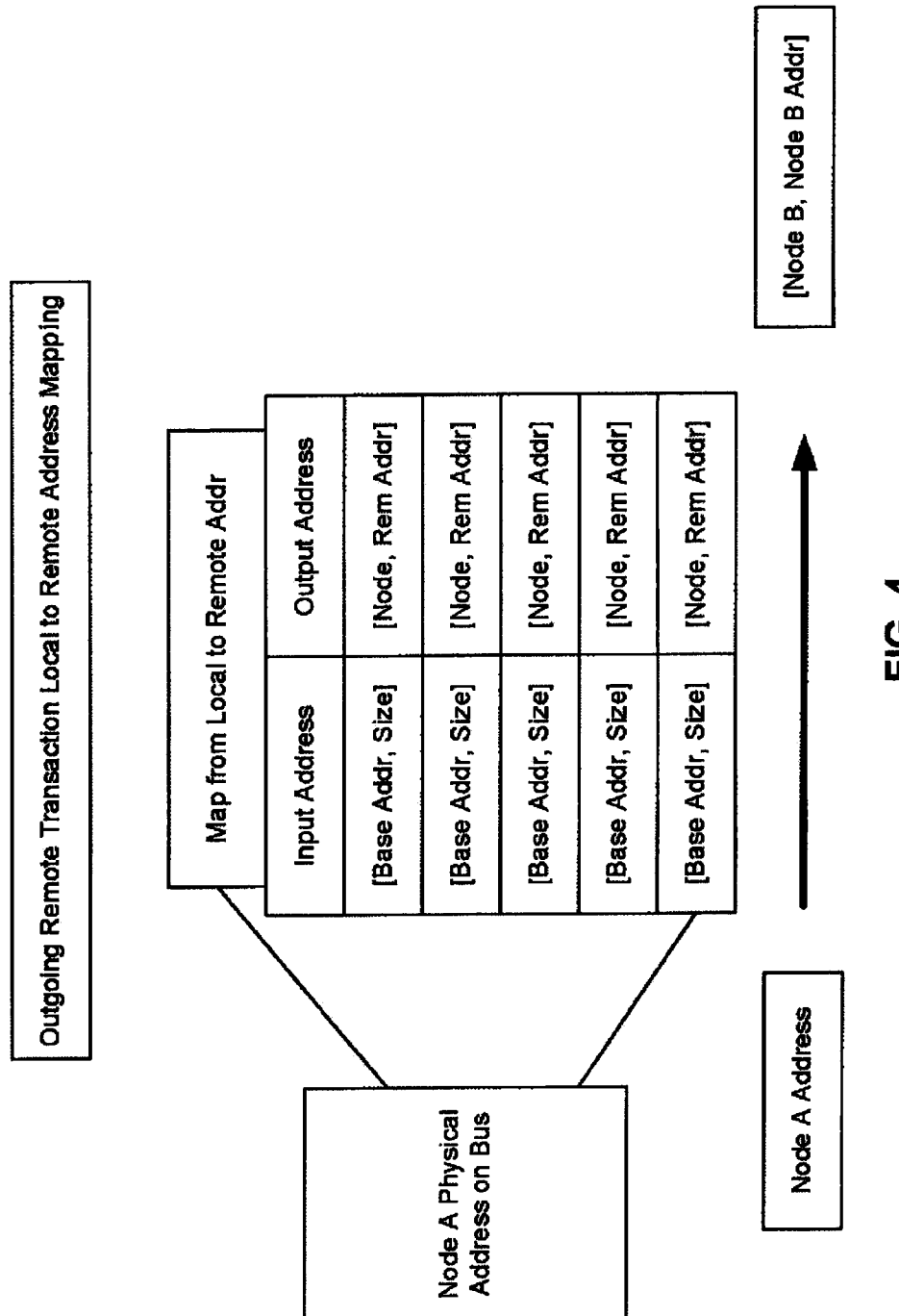
FIG. 4 is a diagram showing local to remote address mapping.

FIG. 4 illustrates the first stage of a remote shared memory access transaction using the Remote Bus Personality portion of the module of FIG. 3. As shown in FIG. 4, a bus master on Node A issues a load or store transaction to a range of physical addresses mapped to the Remote Bus Personality portion. The transaction appears as a bus transaction on FIG. 3, on Bus Fabric 301. The SOC busses of Bus Fabric 301, such as an ARM AXI, have configurable address and data widths, as an example 40 address bits, and 64-128 data bits.

The transaction flows through the Bus Bridge 306 as illustrated in FIG. 3 packetizing the bus transaction and creating one or more flits optimized for the fabric switch 308. The packetized transaction flows through the Remote Bus Processor 307 to create the routing header for the fabric. The remote bus packets are required to be delivered to destination server B in-order and with guaranteed delivery. If the underlying fabric and fabric switch do not implicitly have these characteristics, then the Remote Bus Processor 307 is required to implement in-order and guaranteed delivery.

The resulting routing frame flows into the fabric switch 308 on Node A, is routed through the intervening fabric (See FIG. 1), which may consists of multiple routing hops, and is delivered to the fabric switch on target Node B. For example, comparing FIG. 1, Node A might be node N30 and target Node B could be represented as node N014. The packet from fabric switch 308 of Node A is identified as a remote bus transaction, and is delivered to the Remote Bus Processor 307 on Node B.

Node B's Remote Bus Processor 307 implements the receiving side of in-order and guaranteed delivery in conjunction with the transmitting side. This can include notification of the sender of errors, missing flits, and request for retransmission, The Remote Bus Processor 307 of Node B then strips the routing header, sending the packetized transaction into the Bus Bridge 306. The Bus Bridge module 306 of Node B unpacks the packetized transaction (which may have included collecting multiple flits), and reconstitutes a valid transaction posted to Node B's bus. Any responses to that bus transaction are seen by this subsystem, and sent back to Node A following the same mechanism, There are several functional and performance issues related to this cache coherency example. First, coherent memory transactions issued by CPUs in node A will not snoop caches on remote nodes to maintain efficiency. Second, incoming remote transactions from a Remote Bus Personality section can be implemented as one-sided cache coherent. This means that incoming loads or stores can optionally be configured to snoop and perform coherency protocols against processor caches. Finally, this provides a powerful, easy to use cache coherent programming mode without the performance and availability problems related to a full CC-NUMA (cache coherent—non-uniform memory access) design.

Example 2: Remote Bus Personality Module—Remote Interrupts

In many SOC bus infrastructures, interrupts are individual lines that feed into an interrupt controller for the processor(s) such as the Remote Interrupt Manager 303 of FIG. 3. These individual interrupt lines are sometimes OR'd with each other to map multiple interrupt sources to a single interrupt line.

For example, if server A (such as Node N30 of FIG. 1) processor generates an interrupt on server B (such as Node N14 of FIG. 1): First, Server A writes to a remote CSR (control status register) on server B which maps to the requested interrupt, such as the an interrupt line of Interrupt Manager 303 of FIG. 3. The interrupt line is made active and interrupts the Remote Bus Processor 307 on server B.

As another example, an I/O interrupt on server A can be reflected to an interrupt on server B. An I/O controller on server A (like a SATA controller) raises an interrupt line that is being monitored by the Remote Interrupt Manager 303, FIG. 3. The Remote Interrupt Manager 303 gets woken by an interrupt line that it is being monitored. Remote Interrupt Manager 303 creates a packet tagged as an interrupt packet and sends it into the Remote Bus Processor 307. This interrupt packet flows through the fabric as described above. When the interrupt packer reaches server B, the interrupt packet is delivered to Remote Bus Processor 307, which notes the specially tagged interrupt packet and sends it to the remote interrupt manager 303 of server B. Remote interrupt manager 303 causes the specified interrupt line to go active in server B.

Example 3: Remote Address Translation and Security

Referring to FIG. 3, block 314 is a management CPU core (See also Mgmt Core 205 of FIG. 2). This management CPU 314 is a key part of maintaining fabric security for remote bus transactions. The management CPU 314 maintains multi-node fabric transaction security on both sides of the transaction.

Each Remote Bus Processor 307 is allocated a range of addresses in physical address space. An exemplary process for the secure mapping of an address range from Server B into Server A's address space is as follows.

Figure 5:
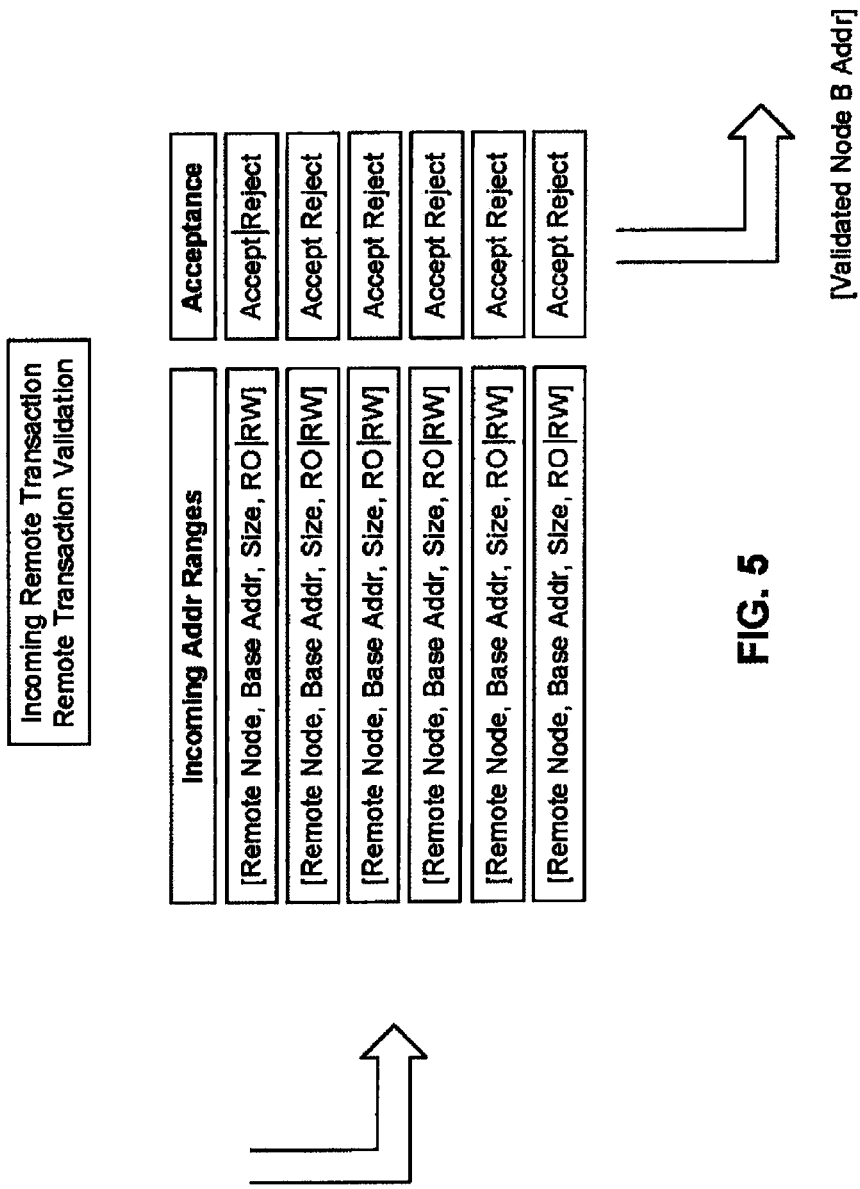
FIG. 5 is a diagram showing validation of a remote transaction.

1. Main OS processor on Server A (block 312 in FIG. 3) sends a mapping request of tuple (node #, physical address in node #'s address space, and window length) to local management processor.
2. Management CPU 314 on Server A has the ability to accept or deny the remote mapping request. Upon local acceptance, management CPU on server A sends a secure management request with the remote mapping request to management CPU 314 on server B.
3. Management CPU 314 on server B has the ability to accept or deny the remote mapping request from Server A.
4. Upon acceptance, management CPU 314 on server B installs a mapping into the I/O MMU on server B, mapping an IPA window to the requested physical address. Additionally the Remote Bus Processor 307 on server B installs a mapping that designates that remote node A has access to that window.
    Mappings can be granted as read-only, write-only, or read-write.
    These mappings are illustrated in FIG. 5.
    These mappings can be implemented using a standard IP block like an I/O MMU, or with custom logic typically using a CAM.
5. Management CPU 314 on server B returns the base intermediate physical address of the window.
6. Management CPU 314 on server A installs a mapping into the local I/O MIVIU mapping from an IPA window on server A to the server B IPA window base address.
7 Management CPU 314 on server A returns the allocated local IPA address for the requested window to the requesting client on the main OS processor 312.

In the described examples, DMA engines on both the local (server A) and remote (server B) sides can be used to hardware facilitate data movement in either direction. Users are not constrained to the classic push OR pull data movement model. Further, many SOC bus transaction models have some notion of trust or security zone associated with that bus transaction. As an example, ARM AXI has the notion of TrustZone, where transactions are marked as being in Trusted World or Normal World. The Remote Bus portion in the Personality Module 300 illustrated in FIG. 3 annotates the bus transaction packet with the trust or security zone with the incoming bus transaction. When the remote server (e.g. server B) is issuing the remote transaction into the local bus fabric, a configuration option is used to define whether the transactions get issued with either the security zone of the requesting processor, or issued at a specific security zone level.

Example 4: Remote Bus Personality Module I/O Physicalization

Figure 6:
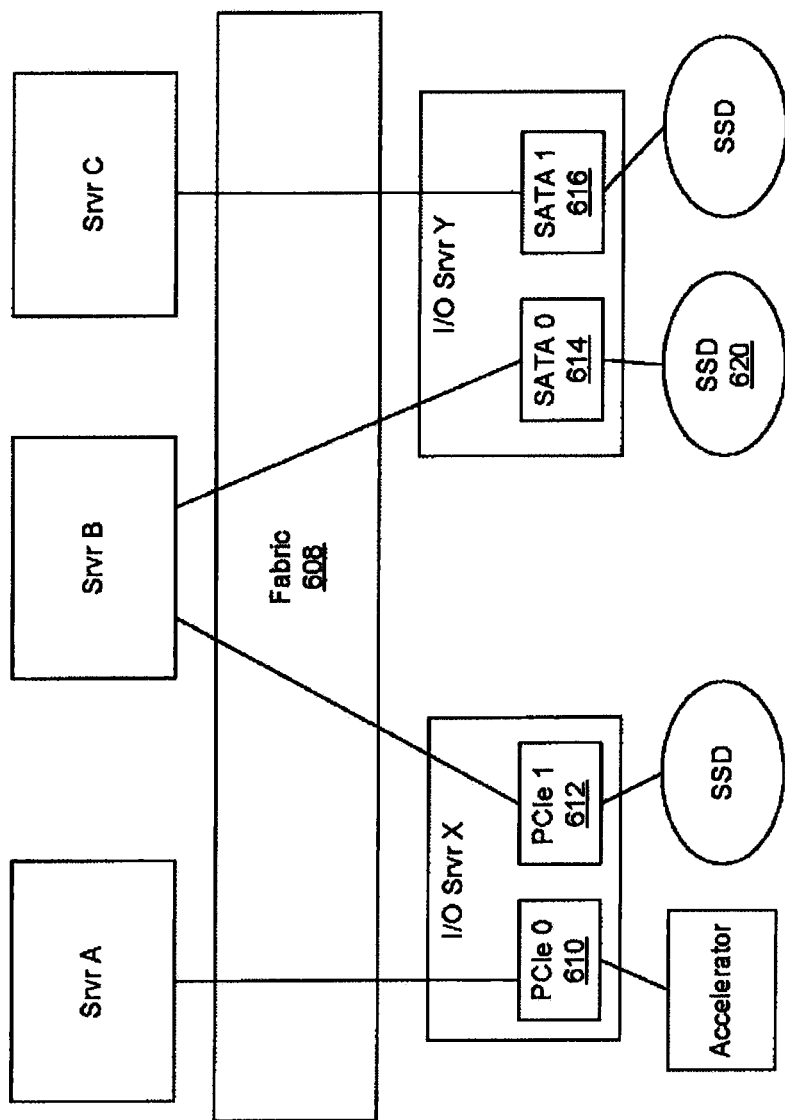
FIG. 6 is a schematic depicting an I/O physicalization.

FIG. 6 illustrates using the Remote Bus Personality portion of the Module 300 of FIG. 3 (i.e., the Remote Bus Personality Module) for I/O Physicalization. Some data center customers desire to have compute servers that have no embedded storage or I/O within the server, and then separate I/O boxes/chassis within the data center rack. The Remote Bus Personality Module of FIG. 3 allows multiple servers, designated as Srvr A, B, and C in FIG. 6, to use unmodified device drivers within the operating systems running in servers A, B, and C to access physically remote I/O devices across the server fabric. The server operating system, device drivers, and applications believe that they are communicating with server local devices. Use of the Remote Bus Personality Module of FIG. 3 allows the device I/O and interrupts to the actual I/O device to be bi-directionally remoted across the fabric with no changes or visibility to software.

Device drivers running on CPUs in the Server boxes (A, B, C) of FIG. 6 access I/O registers transparently across Fabric 608 in the remoted peripheral controller cards, illustrated as remote PCIe controllers 610/612 and remote SATA controllers 614/616 in FIG. 6. Direct memory access ("DMA") engines are located either in the server boxes, or alternatively in the I/O boxes embedded within the peripheral controllers, and the DMA traffic is remoted bi-directionally transparently across Fabric 608. Additionally, interrupts generated by the remote peripheral controllers are transparently transmitted across Fabric 608 and presented to the processors in servers A, B, or C. In this manner, the Remote Bus Personality Module enables remote memory access functionality which includes the ability to allow memory capacity to be provisioned based on workload on a per-node basis, to load/store from remote memory, to perform remote DMA transactions, and to perform remote interrupts.

The address maps, both I/O and memory, and interrupt maps are maintained and transmitted transparently across Fabric 608. In this example, the data flow is completely optimized. An example storage block transfer from SATA controller 614/616 of FIG. 6 would typically become:

The device driver on Srvr B is reading a block from remote SATA 614 connected SSD 620 to a pre-allocated block buffer on a physical address PA1.

The device driver programs and initiates the read by writing the appropriate control registers in remote SATA controller 614.

Remote SATA controller 614 contains an embedded DMA engine which initiates the DMA, reading the data from the remoted SSD, and landing the data directly into physical address PA1 in Srvr B's address space.

No network communication or additional data copies were needed in this optimized transfer.

Figure 7:
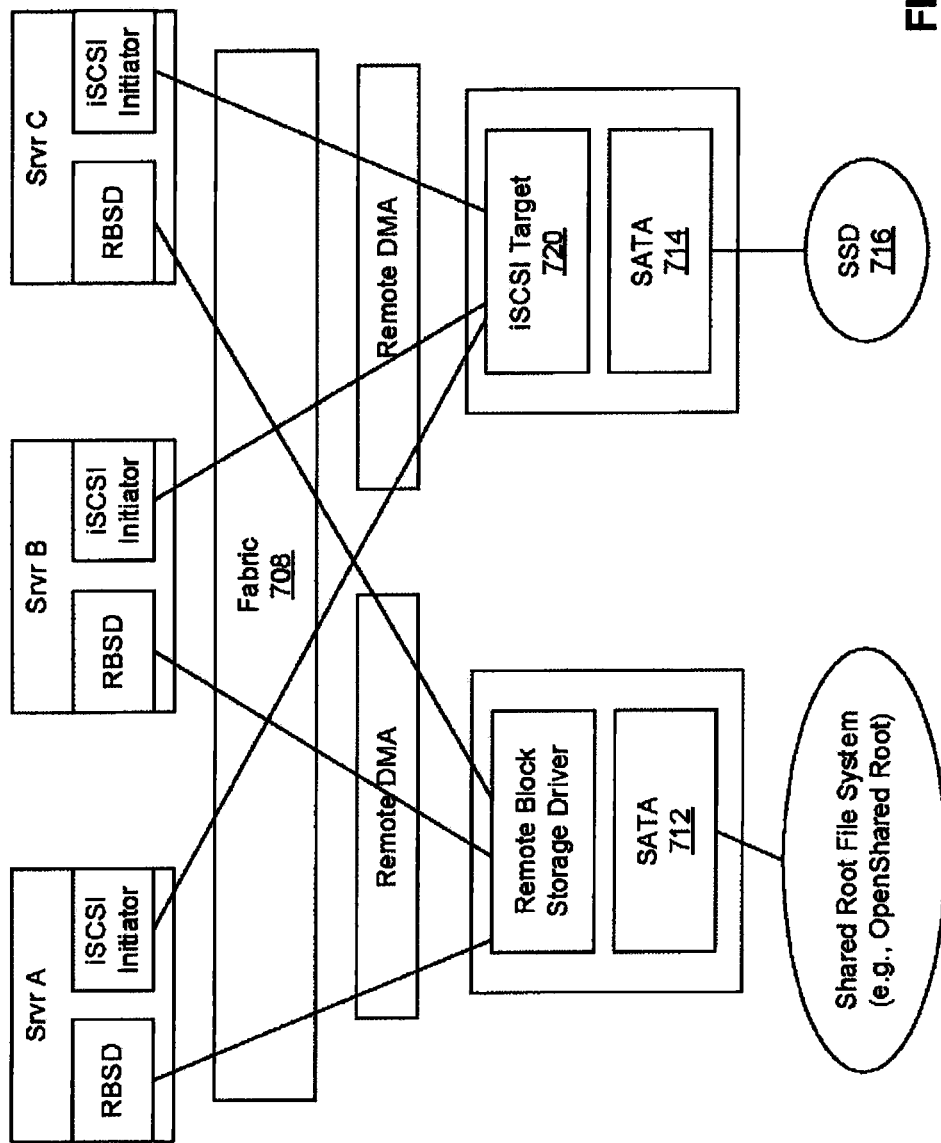
FIG. 7 is a schematic showing high performance distributed shared storage.

Example 5: Remote Bus Personality Module Enabling High Performance Distributed Shared Storage FIG. 7 illustrates an alternate distributed storage example. Distributed storage functionality is an embodiment of remote memory access functionality in which the remote memory is non-volatile memory (i.e., storage type memory), In this case the computational servers are illustrated as Srvr A, B, C. The I/O server boxes containing the storage peripherals in this use case have processors as well. This high performance shared storage example has one additional data movement from the example 4, I/O physicalization. But this example 5 adds the additional capabilities that the I/O devices and controllers can be shared by multiple servers.

In FIG. 7 a method of storage block transfer from a SATA controller is as follows.

The device driver on Srvr A is reading a block from remote SATA 714 connected SSD 716 to a pre-allocated block buffer on a physical address PA1.

The read is initiated by sending a lightweight message across Fabric 708 from Srvr A to Target I/O server 720 that contains the description of the read (device, block, size) and the physical address in Srvr A that the data should be moved to.

The driver on SATA device 714 on Target I/O server 720 initiates the DMA read to its local buffer from its local SATA controller.

Upon the completion of the DMA transfer to the I/O servers buffer, the device driver on the I/O server 720 uses a local DMA engine to initiate a fabric remoted DMA transfer from its local buffer to the physical address of the buffer in the requesting server's address space.

The device driver programs and initiates the read by writing the appropriate control registers in controller of remote SATA 714.

This example requires one additional data movement as compared to the I/O Physicalization example 4, but is far more efficient than a traditional network oriented SAN or NAS remote storage data movement.

The discussion now turns to disassociation of memory (e.g., preferably mutable memory) from a cluster of nodes while enabling those nodes the ability to do full load/store/barrier instructions to a memory pool (e.g., aggregation of memory resources provided at a centralized location) through allocation of memory of the memory pool to the nodes based on workload on a per-node basis. Such implementation is referred to herein as pooled memory functionality. Implementing pooled memory functionality in this manner supports allocation of memory privately on a per node basis and allocation of memory to all or a portion of the nodes in a non-coherent, shared manner. Furthermore, in view of the disclosures made herein, a skilled person will appreciate that remote memory access functionality in accordance with the present invention supports implementation of near shared memory using, for example, HMC (hybrid memory cubes) memory resources and supports implementation of far shared memory over a SoC node fabric using, for example, both HMC and DDR memory resources.

A node cluster architecture 800 is shown in FIG. 8A. The node cluster architecture 800 is configured for providing remote memory access functionality in accordance with the present invention. More specifically, the node cluster architecture 800 includes a plurality of compute nodes 805 and a plurality of memory controller nodes 810 that are connected via a fabric 815 (i.e., links extending between fabric switches of interconnected nodes). Each one of the memory controller nodes 810 has memory 820 coupled thereto. Jointly, the memory 820 attached to all or a portion of the memory control nodes 810 is referred to herein as pooled memory. Preferably, aside from resident memory provisioning, the underlying architecture of the compute nodes 805 and the memory controller nodes 810 is entirely or substantially the same.

Figure 8B:
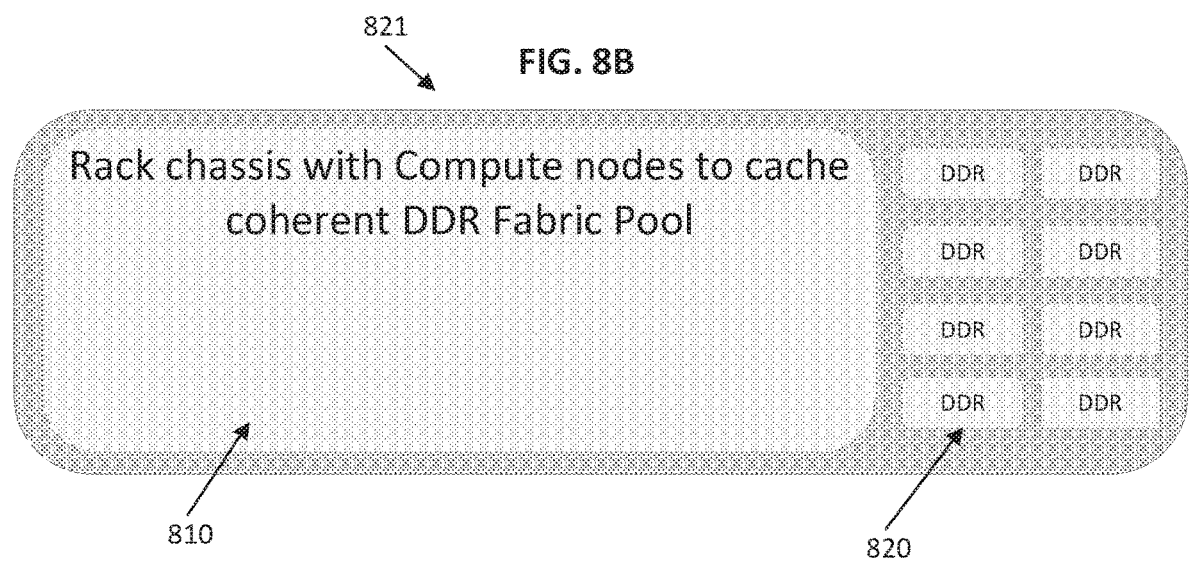
FIG. 8B is a diagram showing a memory controller node chassis in accordance with one embodiment of the present invention.
Figure 8C:
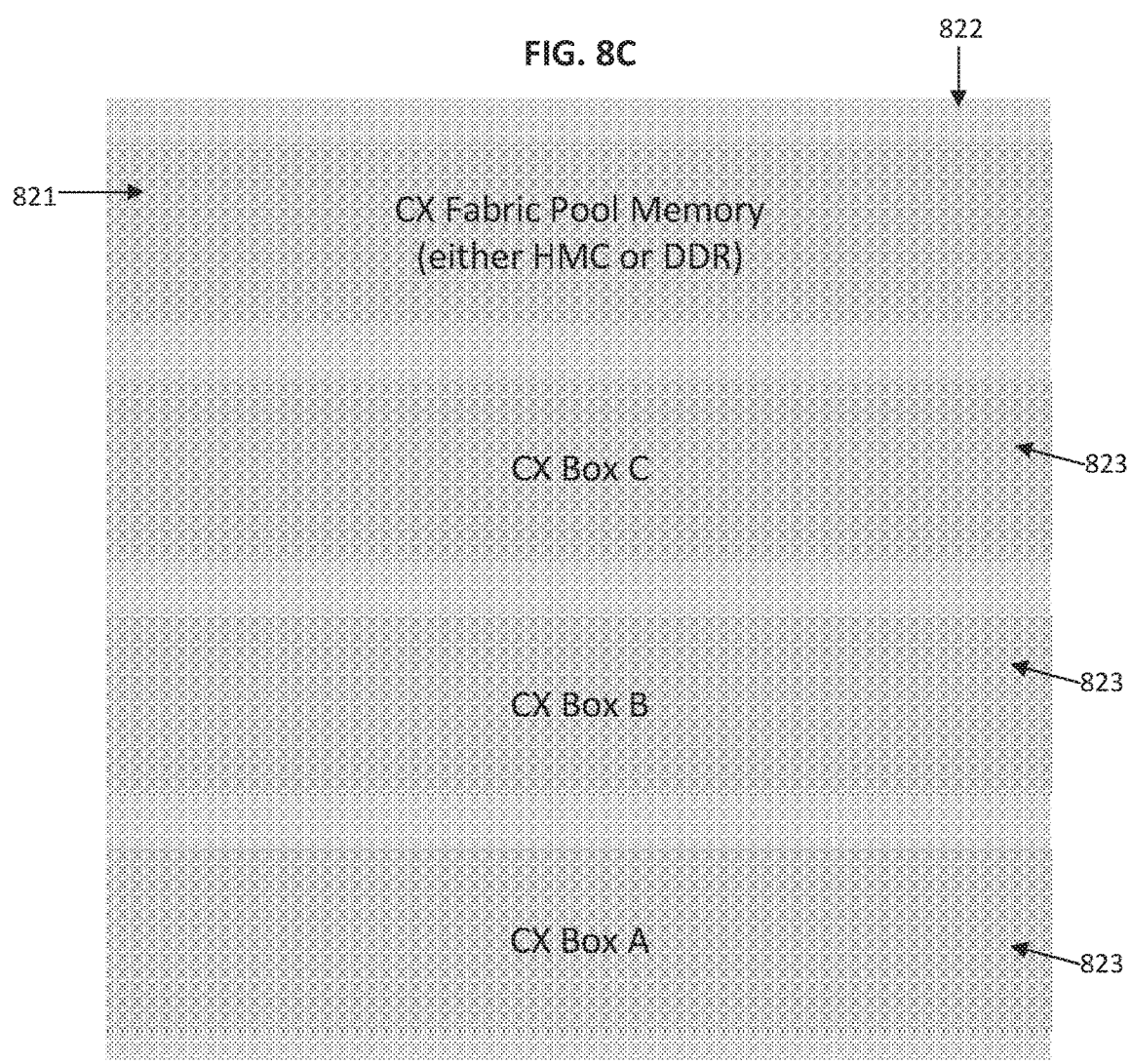
FIG. 8C is a diagram showing a rack with a plurality of compute node chassis utilized in a rack with the memory controller node chassis of FIG. 8B in accordance with one embodiment of the present invention.

A plurality of the compute nodes 805 can be provided on a single card (i.e., a compute node card) and a plurality of the memory controller nodes 810 can be provided on a single card (i.e., a memory controller node card). The compute node card and memory controller node card can have identical overall planar dimensions such that both types of cards have a common or identical planar form factor. Each compute node 805 and each memory controller node 810 can have a plurality of SoC units thereon that provide information processing functionality. By definition, a compute node card will be populated more densely with SoC units that will be a memory controller node card. Preferably, but not necessarily, an architecture of the SoC units of the compute node cards is substantially the same or identical to that of the memory controller node cards, The compute nodes 805 are each provisioned (i.e., configured) with a limited amount of local memory 807 and are packaged together (i.e., integrated with each other) with the goal of optimizing compute density within a given form factor (i.e., maximizing computer density in regard to cost, performance, space, heat generation, power consumption and the like). The memory controller nodes 810 are provisioned with a relatively large amount of local memory and together provide the pooled memory resource at a chassis, rack or cluster level (i.e., to maximizing poled memory in regard to cost, performance, space, heat generation, power consumption and the like for a given form factor). Put differently, a compute node card has insufficient memory resources for enabling intended data computing performance (e.g., data processing throughput) of compute nodes thereof and a memory controller node card has insufficient node CPU resources for enabling intended data computing performance (e.g., put/get and/or load/store utilization) of the pooled memory thereof. In this regard, intended data computing functionality of the server apparatus requires that the server apparatus include at least one computer node card and at least one memory controller card Each compute node 805 can be allocated a portion of the pooled memory 820, which then serves as allocated memory to that particular one of the compute nodes 805. In this regard, the pooled memory 820 can be selectively allocated to and be selectively accessed by each one of the nodes (i.e., via pooled memory functionality). As shown in FIG. 8B, the one or more memory controller nodes 810 and associated pooled memory 820 (e.g., DDR as shown or HMC) can be implemented in the form of a memory controller node chassis 821. As shown in FIG. 8C, the memory controller node chassis 821 can be utilized in a rack 822 with a plurality of compute node chassis 823 that share memory resources of the memory controller node chassis 821. In this regard, one or more compute nodes 805 (or cards comprising same) and one or more memory controller nodes 810 with associated pooled memory 820 (or cards comprising same) can be referred to as a pooled memory server apparatus. It is also disclosed herein that a pooled memory server apparatus configured in accordance with the present invention can include a storage controller node chassis that is similar to the memory controller chassis except with storage resources (e.g., non-volatile storage resources such as hard disk drives) as opposed to memory resources (e.g., RAM).

In view of the disclosures made herein, a skilled person will appreciate that an underlying goal of the node cluster architecture 800 is to provide a fabric attached pool of memory (i.e., pooled memory) that can be flexibly assigned to compute nodes. For example, in the case of a dense node board such as that offered by Calxeda Inc under the trademark EnergyCard, every node of the compute node card (i.e., a plurality of nodes on a single board substrate) has a constrained, small number of DIMMs (e.g., every compute node having a constrained, small no. of DIMMs (e.g., 1)) and requires every node to have a relatively constrained amount of DRAM (e.g., every compute node to have something 4-8 GB of DRAM). But, in practical system implementations, some nodes will need different memory provisioning for specific requirements thereof (e.g., for Hadoop NameNode functionality, for Memcache functionality, for database functionality).

Pooled memory in accordance with embodiments of the present invention, which is attached to computer nodes though a fabric (i.e., fabric memory pools), support standardized dense node cards such as the Calxeda brand EnergyCard but allows them to be memory provisioned differently. In one specific implementation (shown in FIG. 8A), the bulk of the node cards in a cluster are cards with compute nodes (i.e., compute node cards). These compute node cards are configured with memory that is optimized with respect to capacity, power, and cost (e.g., one DIMM per channel). A variant of the compute node cards are cards are configured with associated pooled memory (i.e., pooled memory cards). The pooled memory cards, which are memory controller node cards in combination with associated pooled memory thereon, can be configured as maximum DRAM capacity cards. For example, the pooled memory cards can utilize multiple DIMMs per channel, RDIMMs at high densities (and higher power) or the like. This additional DRAM power is amortized across the fabric because there are likely a relatively small number of these pooled memory cards in comparison to compute node cards.

Embodiments of the present invention allow for pooled memory cards to be physically provisioned in a variety of different configurations. In support of these various physical provisioning configurations, pooled memory cards can be provisioned based on DIMM density (e.g., maximized DIMM density) or can be provisioned based on DRAM capacity (e.g., maximized DRAM capacity). In regard physical placement of the pooled memory cards, various rack and chassis positioned are envisioned. In one implementation (i.e., chassis provisioning), all or a portion of the pooled memory cards are configured for maximum DRAM capacity and serve as a chassis fabric memory pool. In another implementation (i.e., rack provisioning), a memory appliance (1U or 2U) is fabric connected within the rack using pooled memory cards are configured for maximum DRAM capacity. In another implementation (i.e., end of row provisioning), an entire rack is provided with pooled memory cards and serves as a memory rack that is at the end of a row of racks with computer nodes (i.e., compute racks). In still another implementation (i.e., distributed provisioning), all pooled memory cards are configured for maximum DRAM capacity and Linux NUMA APIs are used to create a distributed far memory pool. Additionally, Linux can even round-robin pages across the NUMA memory pool.

Figure 9:
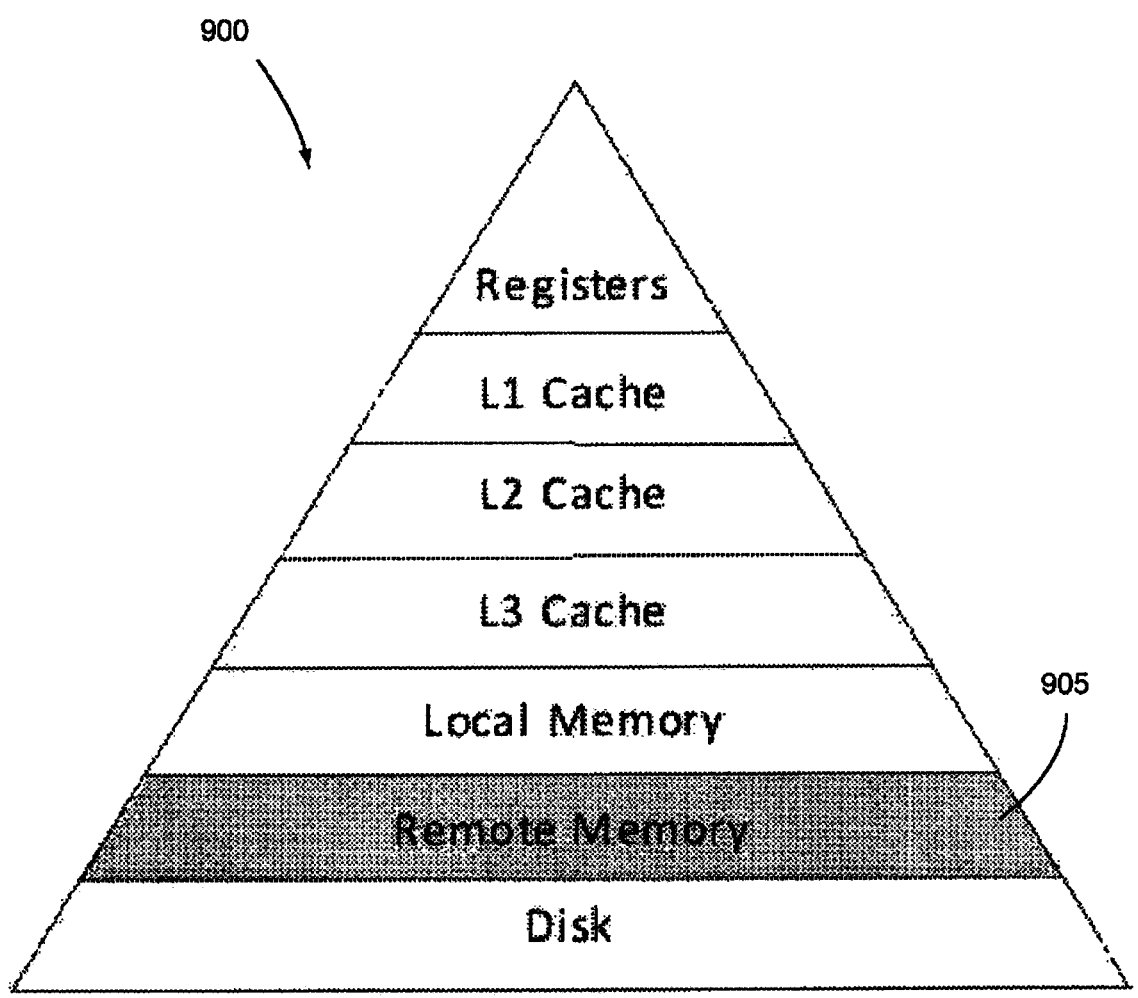
FIG. 9 is a diagram showing a memory hierarchy structure for computer nodes in accordance with one embodiment of the present invention.

FIG. 9 shows a memory hierarchy structure 900 of each one of the computer nodes 805. As shown, the memory hierarchy structure 900 of each one of the computer nodes 805 has various memory resources. Of particular interest to remote memory access functionality implemented in accordance with the present invention is Remote Memory Layer 905, which introduces an additional level into the memory hierarchy structure 900 of each compute node. The Remote Memory Layer 905 enables a SoC (i.e., system) architecture where memory resources can be pooled at the cluster level and allocated amongst the nodes in a cluster (i.e., a plurality of nodes interconnected by a fabric). The Remote Memory Layer 905 allows memory capacity per node to be changed based on workload needs by changing the amount of pooled memory that is provisioned per node. This disaggregation and pooling of memory resources at the cluster level provides for better overall memory capacity utilization and lower power. Furthermore, the Remote Memory Layer 905 supports two types of accesses to remote memory that is mapped into a node's physical address space: a) coarse-grain accesses that rely in virtual-memory paging and involves transferring pages between remote and local memories and, b) fine-grain accesses that trigger cacheline transfers from the remote memory as a result of loads/stores from a node's operating system CPU to remote memory.

Figure 10:
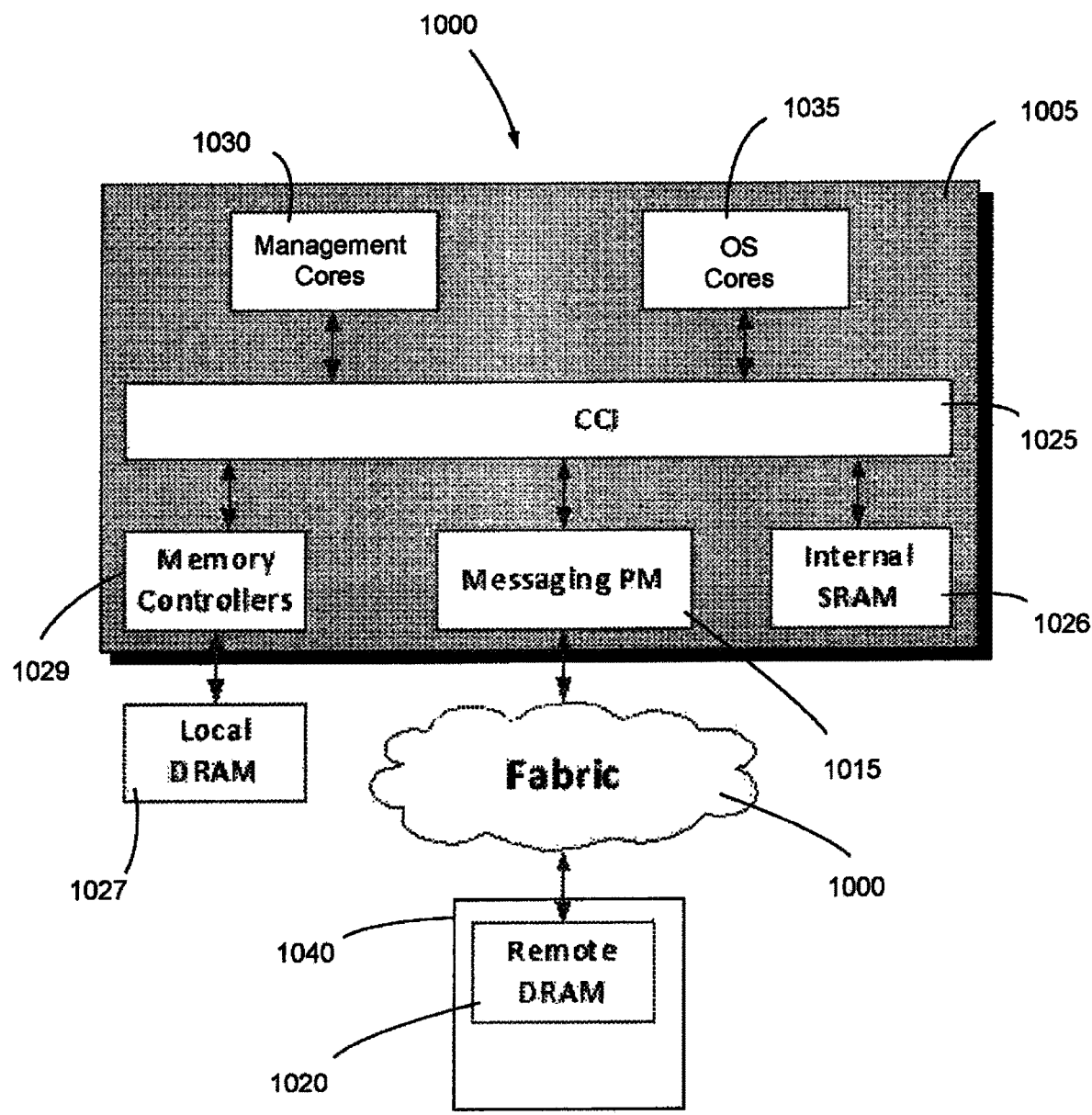
FIG. 10 is a diagram showing a functional block diagram configured for implementing remote memory access functionality in accordance with one embodiment of the present invention.

FIG. 10 shows a functional block diagram 1000 configured for implementing remote memory access functionality. The functional block diagram 1000 supports remote memory by a compute node 1005 (i.e., one of a plurality of computer nodes) across a fabric 1010. A Messaging Personality Module (i.e., the Messaging PM 1015) of the compute node 1005 serves as a hardware interface to remote DRAM 1020 (i.e., remote memory). The Messaging PM 1015 is connected to a cache coherent interconnect 1025 of the computer node 1005 such as through AXI Master and Slave interfaces thereof. The cache coherent interconnect 1025 has direct access to internal SRAM 1026 of the computer node 1005. Local DRAM 1127 (e.g., on a card level substrate on which the node is mounted) is coupled to the cache coherent interconnect 1025 via one or more memory controllers 129. Remote memory addresses of the remote DRAM 1020 are mapped to the Messaging PM 1005 through the AXI Master Port on the cache coherent interface 1025. Loads and stores to the remote DRAM 1020 by management cores 1030 (i.e., management processors) and operating system cores 1035 (i.e., OS processors) are diverted to the Messaging PM 1015, which then encapsulates these accesses in fabric packets and transports them to a memory controller node 1040 that serves the remote DRAM 1020 (i.e., the receiving controller node 1140). The memory controller node 1040 that serves the remote DRAM 1020 includes an instance of the Messaging PM. The receiving Messaging PM 1040 performs the requested access by reading or writing the local memory (e.g., local DRAM) of the memory controller node through its cache coherent interconnect.

In one embodiment, the functional block diagram 1000 is implemented via components of the multi-protocol personality module 300 discussed above in reference to FIG. 3. The Messaging PM 1005 can be embodied by the Remote interrupt Manager 303, the Remote Address translation module 305, the Bus Bridge 306 and the Remote Bus Processor 307. The cache coherent interconnect 1025 can be embodied by the bus fabric 301. The fabric 1010 can be implemented via one or more ports accessible to the fabric switch 308 for enabling access to the remote DRAM 1020.

In some embodiments of the present invention, the allocation of pooled memory (i.e., memory associated with one or more memory controller nodes) to individual compute nodes can managed by a cluster-level memory manager. This memory manager can be a software entity that is a standalone management entity or that is tightly integrated into other cluster-level management entities such as, for example, a job scheduler, a power management entity, etc. The allocation of the remote memory that is mapped into address space of a compute node to applications running on that computer node can be managed by an operating system (OS) or a virtual memory manager (VMM) using known virtual memory management and memory allocation techniques. For example, the OS and/or VMM can employ non-uniform memory access (NUMA) memory allocation techniques to distinguish between allocation of local memory and remote memory.

In view of the disclosures made herein, a skilled person will recognize that embodiments of the present invention enable various mechanisms of pooled memory functionality to be implemented. Pooled memory functionality is a specific implementation of remote memory access functionality. Examples of these mechanisms of pooled memory functionality include, but are not limited to, remote memory being mapped to physical address space of a node, load/store access being carried out from a CPU of a node, get/put access from user space, and DMA memory content transactions from remote memory to local memory. The benefits of these mechanisms of pooled memory functionality include, but are not limited to, disaggregated memory that can be used across multiple SoC generations, computer nodes can be assigned total memory based on workload characteristics, get/put into remote memory enables low-latency optimizations (e.g., via key/value stores, memcached, etc).

The remote memory architecture embodied within the functional block diagram 1000 can support two primary styles of pooled memory functionality. A first one of these styles of pooled memory functionality relates to shared remote memory. A second one of these styles of pooled memory functionality relates to disaggregated private memory. These use cases differ in whether an allocated portion of the pooled memory (i.e., remote memory) is mapped into the address space of a compute node and in how the allocated portion of the pooled memory is accessed.

The style of pooled memory functionality relating to shared remote memory involves remote memory get/put operations. In this style of pooled memory functionality, processor initiated bus cycles (i.e. load/stores) would not be directly remoted across the fabric. Rather, very low-latency user-space proxies for direct load/stores would be provided. These remote memory accesses represent get/put and/or load/store operations.

Figure 11:
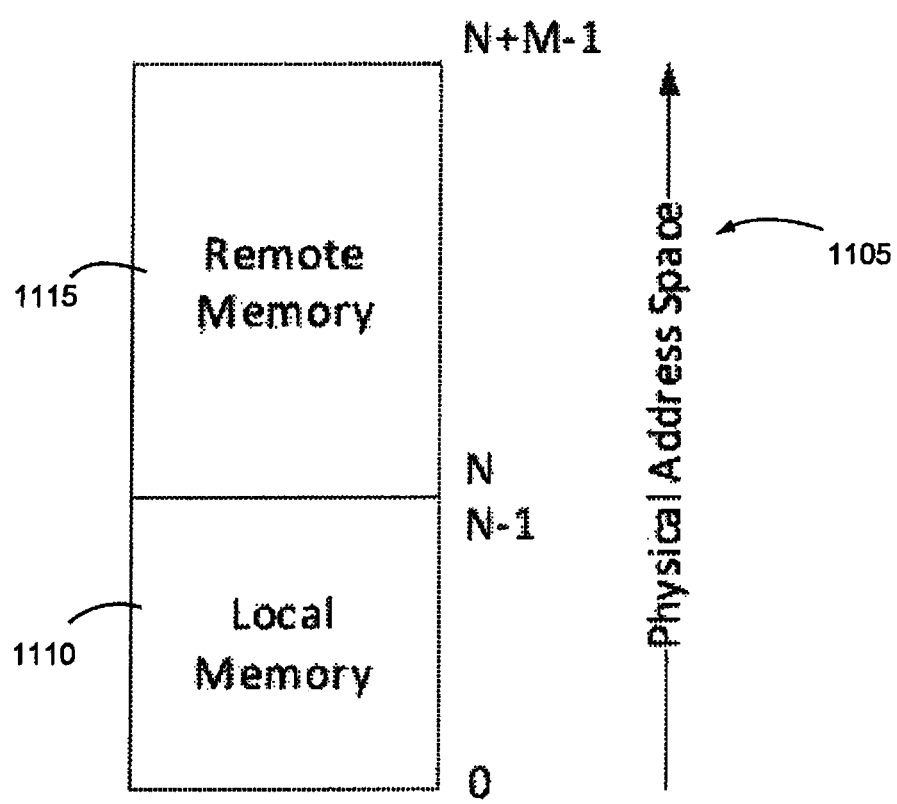
FIG. 11 is a diagram showing physical address space of a particular one of the compute nodes shown in FIG. 8.

In the case pooled memory functionality relating to disaggregated private memory, as shown in FIG. 11, a physical address space 1105 of a particular compute node (e.g., a particular one of the compute nodes 805 shown in FIG. 8A) has local physical memory 1110 residing at its bottom portion and has the allocated remote memory (i.e., allocated remote memory 1115) mapped into its higher physical addresses. The allocated remote memory is not shared with any other nodes but is cacheable by management and OS cores of the node. Furthermore, the allocated remote memory is not directly accessible by user-space applications. In other words, accesses to allocated remote memory use physical addresses generated either by the paging mechanism implemented by the OS/VMM or by a memory management unit of the node's central processing unit. Accesses to allocated remote memory will typically higher latencies compared to accesses to local memory. This is due at least in part to memory bandwidth of the allocated remote memory being constrained by bi-section bandwidth of the fabric interconnecting the computer nodes and will likely be lower than the memory bandwidth of the local memory. Therefore, well-known memory hierarchy concepts such as caching and pre-fetching can be utilized for optimizing accesses to the allocated remote memory.

A primary goal of disaggregated private memory is to provide a fabric attached pool of memory (i.e., fabric attached pooled memory) that can be flexibly assigned to compute nodes. Native load/store transactions supported over a fabric. Examples of these native load/store transactions include, but are not limited to, transactions associated with global fabric address space, transactions associated with compute nodes carrying out read/write operations to remote memory, and transactions associated with remote DMA of memory content into physical memory of a compute node. In implementing disaggregated private memory in accordance with embodiments of the present invention, compute nodes will have private memory (e.g., private mutable memory) and can share a pool of fabric accessible memory (e.g., cacheable, non-coherent shared memory). Furthermore, fabric pool memory configured in accordance with embodiments of the present invention can be implemented within a chassis or across a largest possible fabric (e.g., across one or more rack).

Implementations of disaggregated private memory as disclosed herein can be considered as a class of remote NUMA memory (i.e., one-sided cache coherent which is also known as I/O coherent). For example, certain commercially available operating systems (e.g., Linux brand operating systems) have support for NUMA memory in the form of a NUMA subsystem, More specifically, Linux brand operating systems have NUMA awareness such as via numactl (e.g., control NUMA policy for processes or shared memory), Lib numa (e.g., NUMA policy API), and enhanced topology detection. Additionally, malloc-type memory allocation functionality is configured to ensure that the regions of memory that are allocated to a process are as physically close as possible to the core on which the process is executing, which increases memory access speeds. A node cluster architecture configured in accordance with the present invention can be configured to integrate with such a NUMA subsystem for allowing kernel and applications to have control of memory locality without having to expose new APIs and malloc-type memory allocation functionality for increasing memory access speeds.

Implementations of disaggregated private memory as disclosed herein can utilize device controllers (e.g., memory device controllers) that are physically allocated to remote nodes. This type of implementation is exemplified herein in the discussion relating to Example 4 and FIG. 6. Utilizing device controllers that are physically allocated to remote nodes allows the centralization of memory controllers and memory devices on a set of nodes. For example, the memory controllers and memory devices can be allocated to remote nodes at run-time whereby drivers continue to run on nodes acting as servers, drivers directly access remote memory controllers (e.g., of memory controller nodes), and DMA/interrupts are implemented transparent over the fabric that interconnects the nodes.

Example 6: Memcached Server Revolution

Figure 12:
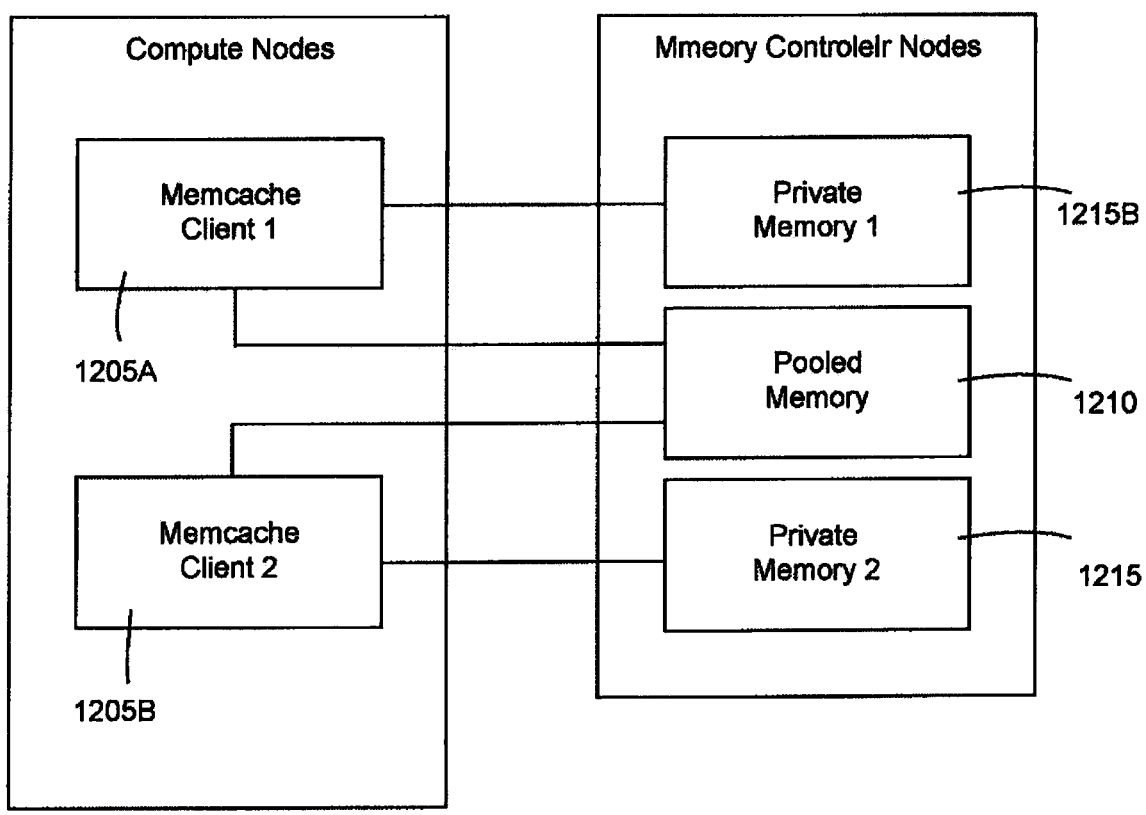
FIG. 12 is a diagram showing an embodiment of the present invention configured for providing memcached server functionality.

FIG. 12 illustrates an embodiment of the present invention configured for providing memcached server functionality 1200. The memcached server functionality 1200 utilizes pooled memory disclosed herein in accordance with the present invention. Memcached server functionality in accordance with the present invention is applicable to a large class of key-value store storage. Advantageously, implementation of the memcached server functionality 1200 in accordance with the present invention allows memcached clients 1205A, 1205B (e.g. web servers) to reach back to a pooled memory 1210 (i.e., memcached memory pool) to get cached values of data without having to go back to their respective database tier. For example, the pooled memory 1210 can be implemented as NUMA fabric pooled memory. The memcached clients 1205A, 1205B can be embodied by one or more compute nodes that are each allocated respective private mutable private memory 1215A, 1215B from pooled memory associated with one or more memory controller nodes. To this end, the memcached clients 1205, the pooled memory 1210, and the private mutable private memory 1215 can be embodied by the pooled memory server apparatus discussed above in reference to FIGS. 8a-8c.

The memcached clients 1205A, 1205B each map access information (e.g., a key) directly and reach into the pooled memory 1210 to obtain the data with a direct memory load. In this manner, unlike the traditional memcached approach, there is no networking needed for access memcached data.

Each one of the memcached servers 1210a-e hashes into local DRAM and returns the hashed value over TCP/IP or UDP, which serves as the communication protocol between the memcached servers and each one of the memcached clients 1205.

In regard to a specific example in which a cluster of SoC nodes (i.e., including Node A and Node B) that are interconnected by a node interconnect fabric, Node A (e.g., through web server functionality thereof) requests an account lookup for Account #100. Web server request goes through a Memcached client API into a memcached client library with a cache data request for Key ID #100. The memcached client library hashes Key ID #100 to the memcached server that holds that data whereby it hashes to Node B that is providing memcached server functionality. The memcached client library determines that Node A and Node B have a remote memory capable fabric between them (e.g., are configured for providing remote memory access functionality in accordance with the present invention). The memcached client library on Node A performs a server-side hash of Key ID #100 and uses a remote memory access to node B to determine if this data is currently encached and, if so, the memory address that contains the data. In the case where it is determined that the data is currently encached, the memcached client library on Node A directly access the remote cached data from Node B's memory address space (e.g., memory address space of Node B's memcached server functionality). The memcached client library then returns the data to the requesting web server on Node A.

Example 7: High Frequency Trading Backend

In support of high frequency trading, stock exchange tick data can stream as multicast packets at rates up to 6 MB/sec or more. The tick data can be highly augmented with derived data thereof A fabric memory pool apparatus is used to store the tick data in one place and accessed by a plurality of trading servers. Referring to the pooled memory server apparatus discussed above in reference to FIGS. 8a-8c, the fabric memory pool apparatus can be embodied in the form of the memory controller node chassis 821 and the trading servers can be embodied in the form of the compute node chassis 823, The tick data is only appended such that the tick data does not have to be multicast and replicated. Furthermore, all compute nodes of the trading servers get direct read-only shared access to the tick data (i.e., via pooled memory of the memory controller nodes) whereby the tick data is still CPU cacheable for frequently accessed data.

Example 8: Message Passing Interface Remote Memory Access (One Sided)

The underlying premise of message passing interface (MPI) remote memory access (RMA) relates to any allocated memory is private to the MPI process by default. As needed, this allocated private memory can be exposed to other processes as a public memory region. To do this, an MPI process declares a segment of its memory to be part of a window, allowing other processes to access this memory segment using one-sided operations such as PUT, GET, ACCUMULATE, and others, Processes can control the visibility of data written using one-sided operations for other processes to access using several synchronization primitives. Referring to the pooled memory server apparatus discussed above in reference to FIGS. 8a-8c, memory of the MPI process can be embodied in the form of the memory controller node chassis 821.

MPI 3rd generation (i.e., MPI-3) RMA offers two new window allocation functions. The first new window allocation function is a collective version that can be used to allocate window memory for fast access. The second new window allocation function is a dynamic version which exposes no memory but allows the user to "register" remotely-accessible memory locally and dynamically at each process. Furthermore, new atomic operations, such as fetch-and-accumulate and compare-and-swap offer new functions for well-known shared memory semantics and enable the implementation of lock-free algorithms in distributed memory.

Example 9: Partitioned Global Address Space Languages (PGAS)

Figure 13A:
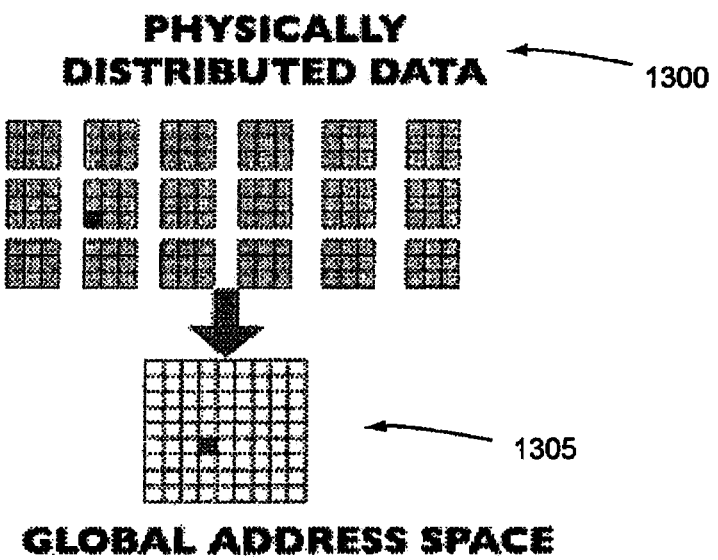
FIG. 13A is a diagram showing an embodiment of the present invention configured for implementing memory storage functionality using Partitioned Global Address Space (PGAS) languages.
Figure 13B:
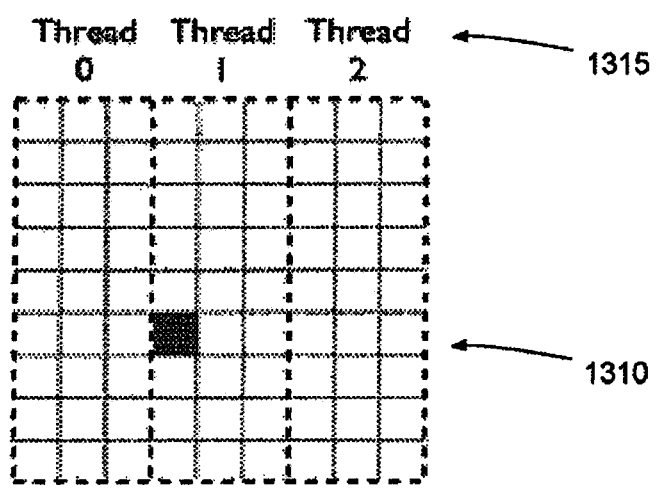
FIG. 13B is a diagram showing a global memory space that is partitioned between participating threads for pooled memory functionality using PGAS languages.

Examples of common PGAS languages include, but are not limited to, Unified Parallel C, Co-Array Fortran, Titanium, X-10, and Chapel. As shown in FIG. 13A, in these PGAS languages, memory distributed over many compute nodes (i.e., distributed memory 1300) is seen as one global memory (i.e., global memory 1305) that can be accessed by all the processes without requiring explicit communication like in MPI. Hidden communication is based on one-sided communication. As shown in FIG. 13B, PGAS languages introduce the concept of a global memory space 1310 that is partitioned between the participating threads 1315 (e.g., ranks in MPI) with each process being able to access both local memory (e.g., distributed memory 1300 local to a particular computer node) and remote memory (e.g., distributed memory 1300 local to a different computer node than the particular computer node). Access to local memory is via standard sequential program mechanisms whereas access to remote memory is directly supported by the new features of the PGAS language and is usually done in a "single-sided" manner (unlike the double-sided of MPI). The single-sided programming model is more natural than the MPI alternative for some algorithms. In accordance with embodiments of the present invention, RDMA and remote memory functionalities allow efficient PGAS capability to be provided. Referring to the pooled memory server apparatus discussed above in reference to FIGS. 8a-8c, the global memory 1305 can be embodied in the form of the memory controller node chassis 821.

Example 10: Disaggregated Server Resources

Currently, disaggregation of server resources is limited to separating compute resources (e.g., CPU and RAM) from storage via separate chassis that are connected via an interface such as, for example, PCIe or SAS. However, data centers and other types of server operating entities will benefit from disaggregation of CPU resources, storage resources, and memory resources. This will allow server operating entities to replace/update CPU resources, storage resources, and memory resources (i.e., server resources) at their respective lifecycle timeframe without having to replace/update one server resource at the particular lifecycle timeframe of another server resource. Advantageously, embodiments of the present invention can provide for such disaggregation of CPU resources, storage resources, and memory resources. In particular, embodiments of the present invention provide for the disaggregation of RAM (i.e., memory resources) from compute node cards (i.e., CPU resources) so that CPU resources can be replaced/updated as new CPU resources (e.g., processors) are released whereas memory resources (e.g., RAM, non-volatile storage, etc) can remain in use as long as they are efficient and/or effectively functional. To this end, referring to the pooled memory server apparatus discussed above in reference to FIGS. 8a-8c, the memory resources can be embodied in the form of the memory controller node chassis 821 (i.e., a first physical enclosure unit), the CPU resources can be embodied in the form of the compute node chassis 823 (i.e., a second physical enclosure unit), and the storage resources can be embodied in the form of the storage controller node chassis (i.e., a third physical enclosure unit). Memory resources can be in the form of one or more HMCs.

Example 11: Hybrid Memory Cube (HMC) Deployed Near Memory Pool

Figure 14A:
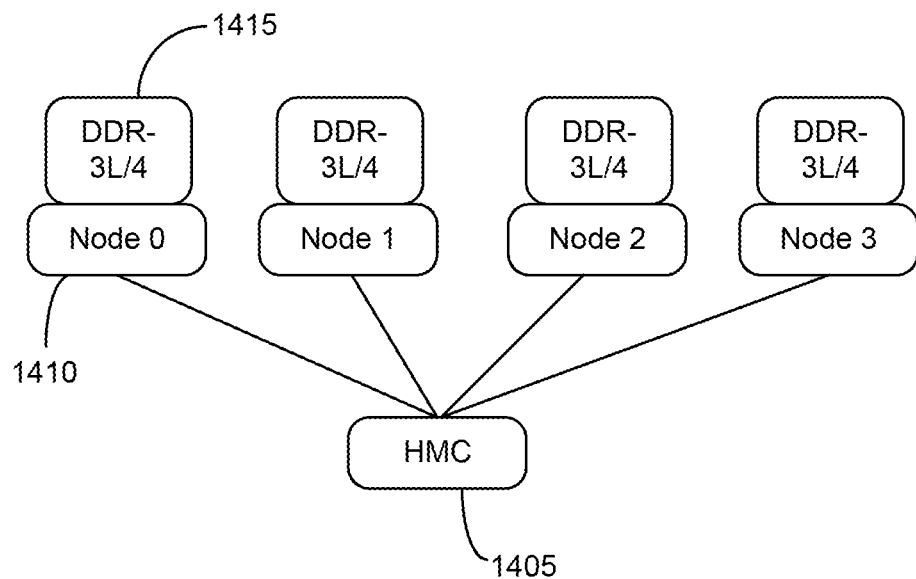
FIG. 14A is a diagram showing an embodiment of the present invention configured for implementing hybrid memory cube (HMC) deployed near memory pools.
Figure 14B:
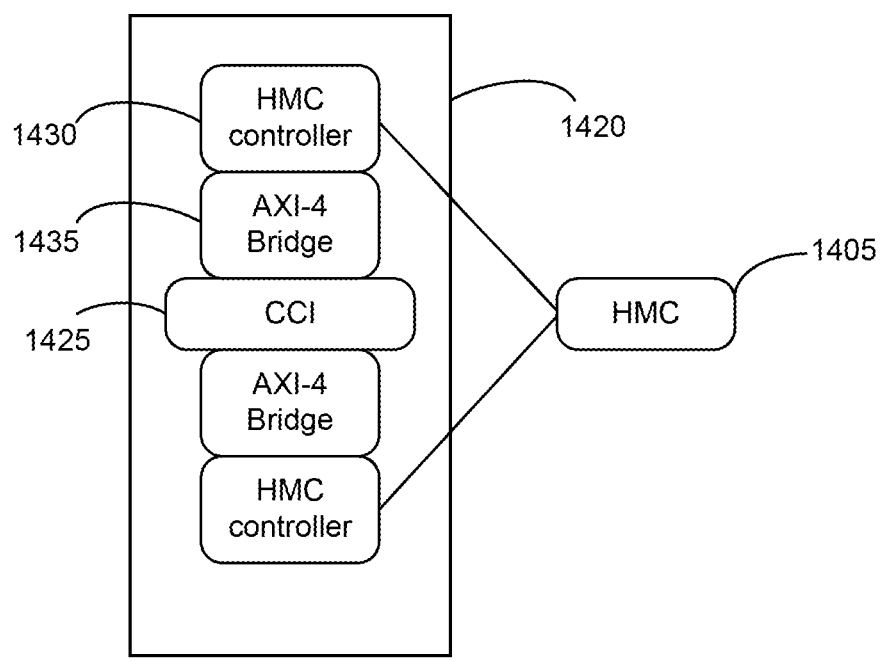
FIG. 14B is a diagram showing a private HMC of compute nodes coupled to a HMC deployed near memory pool.

As shown in FIG. 14A, pooled memory functionality in accordance with the present invention can be implemented in the form of HMC deployed near memory pools. In such an implementation, a HMC unit (i.e., pooled memory) is shared by a plurality of compute nodes 1410 (i.e., the shared HMC unit 1405). For example, the compute nodes 1410 can all be of a common compute node card such as the Calxeda brand EnergyCard. As shown, each one of the compute nodes 1410 can also have respective base memory 1415. In this manner, the compute nodes 1410 can have non-coherent, shared memory and, optionally, private mutable memory. Referring to the pooled memory server apparatus discussed above in reference to FIGS. 8a-8c, the HMC unit can be embodied in the form of the memory controller node chassis 821 and the compute nodes 1410. CPU resources can be embodied in the form of the compute node chassis 823 and the HMC unit 1405 can be embodied in the form of the memory controller chassis. As a skilled person will appreciate, the near memory pools implemented with HMC units do not require a fabric for data communication. As shown in FIG. 14B, each one of the compute nodes 1410 has a respective private HMC 1420. The private HMC 1420 and the shared HMC 1405 each provide HMC links for supporting communication of data therebetween (e.g., 16-lane HMC link with 40 GB/sec link capacity). For example, the HMC units can each include a cache coherent interconnect 1425 (e.g., a fabric bus) having two memory ports (e.g., 25 GB/sec link capacity each) each coupled to a respective HMC controller 1430 by a bridge 1435. In view of the disclosures made herein, a skilled person will appreciate the compute nodes 1410 can be SoC nodes that are interconnected to each other through a node interconnect fabric and that access to the memory resources of the HMC unit 1405 is made over a respective communication link of the HMC unit 1405 without traversing any communication channel of the node interconnect fabric.

Example 12: Far Memory Pool Using Pooled Memory Functionality

Pooled memory functionality in accordance with the present invention can be implemented in the form of far memory pools. In such an implementation, pooled memory is shared by a plurality of compute nodes such as those of a compute node chassis configured in accordance with the present invention. The shared memory can be in the form of cache coherent DDR or cache coherent HMC such as that of a memory controller chassis configured in accordance with the present invention. The shared memory is accessed via a fabric that interconnects the computer nodes. Preferably, but not necessarily, the compute nodes are all of a common compute node card such as the Calxeda brand EnergyCard. Each one of the compute nodes can also have respective base memory. In this manner, the compute nodes can have non-coherent, shared memory and, optionally, private mutable memory.

In summary, in view of the disclosures made herein, a skilled person will appreciate that a system on a chip (SOC) refers to integration of one or more processors, one or more memory controllers, and one or more I/O controllers onto a single silicone chip. Furthermore, in view of the disclosures made herein, the skilled person will also appreciate that a SOC configured in accordance with the present invention can be specifically implemented in a manner to provide functionalities definitive of a server. In such implementations, a SOC in accordance with the present invention can be referred to as a server on a chip, In view of the disclosures made herein, the skilled person will appreciate that a server on a chip configured in accordance with the present invention can include a server memory subsystem, a server I/O controllers, and a server node interconnect. In one specific embodiment, this server on a chip will include a multi-core CPU, one or more memory controllers that supports ECC, and one or more volume server I/O controllers that minimally includes Ethernet and SATA controllers. The server on a chip can be structured as a plurality of interconnected subsystems, including a CPU subsystem, a peripherals subsystem, a system interconnect subsystem, and a management subsystem.

An exemplary embodiment of a server on a chip that is configured in accordance with the present invention is the ECX-1000 Series server on a chip offered by Calxeda incorporated. The ECX-1000 Series server on a chip includes a SOC architecture that provides reduced power consumption and reduced space requirements. The ECX-1000 Series server on a chip is well suited for computing environments such as, for example, scalable analytics, web-serving, media streaming, infrastructure, cloud computing and cloud storage. A node card configured in accordance with the present invention can include a node card substrate having a plurality of the ECX-1000 Series server on a chip instances (i.e., each a server on a chip unit) mounted on the node card substrate and connected to electrical circuitry of the node card substrate. An electrical connector of the node card enables communication of signals between the node card and one or more other instances of the node card.

The ECX-1000 Series server on a chip includes a CPU subsystem (i.e., a processor complex) that uses a plurality of ARM brand processing cores (e.g., four ARM Cortex brand processing cores), which offer the ability to seamlessly turn on-and-off up to several times per second. The CPU subsystem is implemented with server-class workloads in mind and comes with a ECC L2 cache to enhance performance and reduce energy consumption by reducing cache misses. Complementing the ARM brand processing cores is a host of high-performance server-class I/O controllers via standard interfaces such as SATA and PCI Express interfaces. Table 3 below shows technical specification for a specific example of the ECX-1000 Series server on a chip.

TABLE 3

Example of ECX-1000 Series server on a chip technical specification

| | | |
|---|---|---|
| Processor Cores | 1. | Up to four ARM ® Cortex ™-A9 cores @ 1.1 to 1.4 GHz |
| | 2. | NEON ® technology extensions for multimedia and SIMD processing |
| | 3. | Integrated FPU for floating point acceleration |
| | 4. | Calxeda brand TrustZone ® technology for enhanced security |
| | 5. | Individual power domains per core to minimize overall power consumption |
| Cache | 1. | 32 KB LI instruction cache per core |
| | 2. | 32 KB LI data cache per core |
| | 3. | 4 MB shared L2 cache with ECC |
| Fabric Switch | 1. | Integrated 80 Gb (8x8) crossbar switch with through-traffic support |
| | 2. | Five (5) 10 Gb external channels, three (3) 10 Gb internal channels |
| | 3. | Configurable topology capable of connecting up to 4096 nodes |
| | 4. | Dynamic Link Speed Control from 1 Gb to 10 Gb to minimize power and maximize performance |
| | 5. | Network Proxy Support to maintain network presence even with node powered off |
| Management Engine | 1. | Separate embedded processor dedicated for systems management |
| | 2. | Advanced power management with dynamic power capping |
| | 3. | Dedicated Ethernet MAC for out-of-band communication |
| | 4. | Supports IPMI 2.0 and DCMI management protocols |
| | 5. | Remote console support via Serial-over-LAN (SoL) |
| Integrated Memory Controller | 1. | 72-bit DDR controller with ECC support |
| | 2. | 32-bit physical memory addressing |
| | 3. | Supports DDR3 (1.5 V) and DDR3L (1.35 V) at 800/1066/1333 MT/s |
| | 4. | Single and dual rank support with mirroring |
| PCI Express | 1. | Four (4) integrated Gen2 PCIe controllers |
| | 2. | One (1) integrated Gen1 PCIe controller |
| | 3. | Support for up to two (2) PCIe x8 lanes |
| | 4. | Support for up to four (4) PCIe x1, x2, or x4 lanes |
| Networking Interfaces | 1. | Support 1 Gb and 10 Gb Ethernet |
| | 2. | Up to five (5) XAUI 10 Gb ports |
| | 3. | Up to six (6) 1 Gb SGMII ports (multiplexed w/XAUI ports) |
| | 4. | Three (3) 10 Gb Ethernet MACS supporting IEEE 802.1Q VLANs, IPv4/6 checksum processing, and TCP/UDP/ICMP checksum offload |
| | 5. | Support for shared or private management LAN |
| SATA Controllers | 1. | Support for up to five (5) SATA disks |
| | 2. | Compliant with Serial ATA 2.0, AHCI Revision 1.3, and eSATA specifications |
| | 3. | SATA 1.5 Gb/s and 3.0 Gb/s speeds supported |
| SD/eMMC Controller | 1. | Compliant with SD 3.0 Host and MMC 4.4 (eMMC) specifications |
| | 2. | Supports 1 and 4-bit SD modes and 1/4/8-bit MMC modes |
| | 3. | Read/write rates up to 832 Mbps for MMC and up to 416 Mbps for SD |
| System Integration Features | 1. | Three (3) I2C interfaces |
| | 2. | Two (2) SPI (master) interface |
| | 3. | Two (2) high-speed DART interfaces |
| | 4. | 64 GPIO/Interrupt pins |
| | 5. | JTAG debug port |

Figure 15:
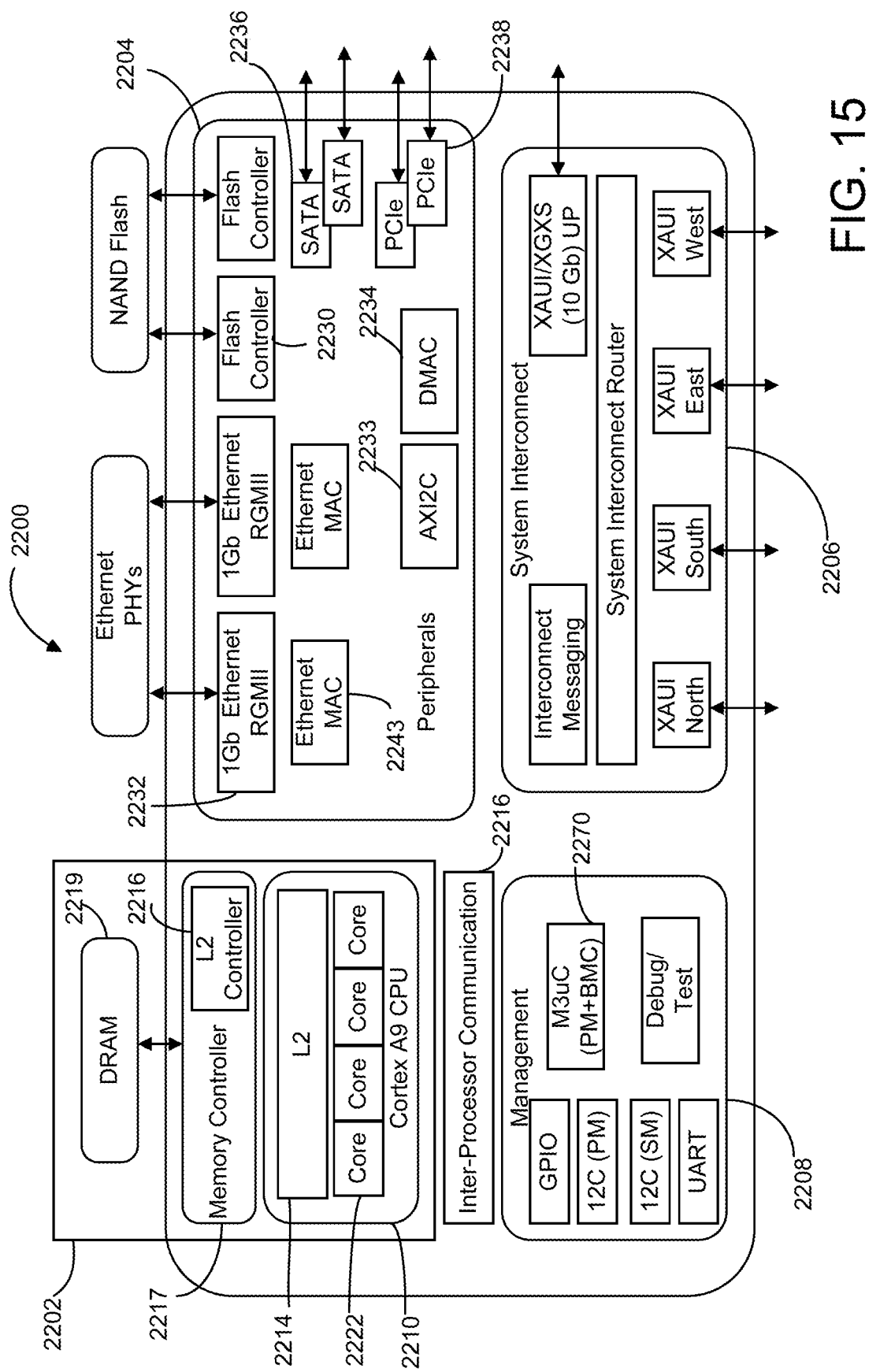
FIG. 15 illustrates a logical view of a system on a chip (SoC).

FIG. 15 shows a SoC unit (i.e., SoC 2200) configured in accordance with an embodiment of the present invention. More specifically, the SoC 2200 is configured for implementing discovery functionalities as disclosed herein. The SoC 2200 can be utilized in standalone manner. Alternatively, the SoC 2200 can be utilized in combination with a plurality of other SoCs on a node card such as, for example, with each one of the SoCs being associated with a respective node of the node card.

The SoC 2200 includes a node CPU subsystem 2202, a peripheral subsystem 2204, a system interconnect subsystem 2206, and a management subsystem 2208. In this regard, a SoC configured in accordance with the present invention can be logically divided into several subsystems. Each one of the subsystems includes a plurality of operation components therein that enable a particular one of the subsystems to provide functionality thereof. Furthermore, each one of these subsystems is preferably managed as independent power domains.

The node CPU subsystem 2202 of SoC 2200 provides the core CPU functionality for the SoC, and runs the primary user operating system (e.g. Ubuntu Linux). The Node CPU subsystem 2202 comprises a node CPU 2210, a L2 cache 2214, a L2 cache controller 2216, memory controller 2217, and main memory 2219. The node CPU 2210 includes 4 processing cores 2222 that share the L2 cache 2214. Preferably, the processing cores 2222 are each an ARM Cortex A9 brand processing core with an associated media processing engine (e.g., Neon brand processing engine) and each one of the processing cores 2222 can have independent L1 instruction cache and L1 data cache. Alternatively, each one of the processing cores can be a different brand of core that functions in a similar or substantially the same manner as ARM Cortex A9 brand processing core. Each one of the processing cores 2222 and its respective L1 cache is in a separate power domain. Optionally, the media processing engine of each processing core 2222 can be in a separate power domain. Preferably, all of the processing cores 2222 within the node CPU subsystem 2202 run at the same speed or are stopped (e.g., idled, dormant or powered down).

The memory controller 2217 is coupled to the L2 cache 2214 and to a peripheral switch of the peripheral subsystem 2204. Preferably, the memory controller 2217 is configured to control a plurality of different types of main memory (e.g., DDR3, DDR3L, LPDDR2). An internal interface of the memory controller 2217 can include a core data port, a peripherals data port, a data port of a power management unit (PMU) portion of the management subsystem 2208, and an asynchronous 32-bit AHB slave port. The PMU data port is desirable to ensure isolation for some low power states. The asynchronous 32-bit AHB slave port is used to configure the memory controller 2217 and access its registers. The asynchronous 32-bit AHB slave port is attached to the PMU fabric and can be synchronous to the PMU fabric in a similar manner as the asynchronous interface is at this end. In one implementation, the memory controller 2217 is an AXI interface (i.e., an Advanced eXtensible Interface).

The peripheral subsystem 2204 of SoC 2200 has the primary responsibility of providing interfaces that enable information storage and transfer functionality. This information storage and transfer functionality includes information storage and transfer both within a given SoC Node and with SoC Nodes accessibly by the given SoC Node. Examples of the information storage and transfer functionality include, but are not limited to, flash interface functionality, PCIe interface functionality, SATA interface functionality, and Ethernet interface functionality. The peripheral subsystem 2204 can also provide additional information storage and transfer functionality such as, for example, direct memory access (DMA) functionality. Each of these peripheral subsystem functionalities is provided by one or more respective controllers that interface to one or more corresponding storage media (i.e., storage media controllers).

The peripherals subsystem 2204 includes the peripheral switch and a plurality of peripheral controllers for providing the abovementioned information storage and transfer functionality. The peripheral switch can be implemented in the form of a High-Performance Matrix (HPM) that is a configurable auto-generated advanced microprocessor bus architecture 3 (i.e., AMBA protocol 3) bus subsystem based around a high-performance AXI cross-bar switch known as the AXI bus matrix, and extended by AMBA infrastructure components.

The peripherals subsystem 2204 includes flash controllers 2230 (i.e. a first type of peripheral controller). The flash controllers 2230 can provide support for any number of different flash memory configurations. A NAND flash controller such as that offered under the brand name Denali is an example of a suitable flash controller. Examples of flash media include MultiMediaCard (MMC) media, embedded MultiMediaCard (eMMC) media, Secure Digital (SD) media, SLC/MLC+ECC media, and the like. Memory is an example of media (i.e., storage media) and error correcting code (ECC) memory is an example of a type of memory to which the main memory 2217 interfaces (e.g., main memory 2219).

The peripherals subsystem 2204 includes Ethernet MAC controllers 2232 (i.e. a second type of peripheral controller). Each Ethernet MAC controller 2232 can be of the universal 1 Gig design configuration or the 10 G design configuration. The universal 1 Gig design configuration offers a preferred interface description. The Ethernet MAC controllers 2232 includes a control register set and a DMA (i.e., an AXI master and an AXI slave). Additionally, the peripherals subsystem 2204 can include an AXI2 Ethernet controller 2233. The peripherals subsystem 2204 includes a DMA controller 2234 (i.e., (i.e. a third type of peripheral controller). DMA functionality is useful only for fairly large transfers. Thus, because private memory of the management subsystem 2208 is relatively small, the assumption is that associated messages will be relatively small and can be handled by an interrupt process. If the management subsystem 2208 needs/wants large data transfer, it can power up the whole system except the cores and then DMA is available. The peripherals subsystem 2204 includes a SATA controller 2236 (i.e. a fourth type of peripheral controller). The peripherals subsystem 2204 also includes PCIe controllers 2238. As will be discussed below in greater detail, a XAUI controller of the peripherals subsystem 2204 is provided for enabling interfacing with other CPU nodes (e.g., of a common node card).

The system interconnect subsystem 2206 is a packet switch that provides intra-node and inter-node packet connectivity to Ethernet and within a cluster of nodes (e.g., small clusters up through integration with heterogeneous large enterprise data centers). The system interconnect subsystem 2206 provides a high-speed interconnect fabric, providing a dramatic increase in bandwidth and reduction in latency compared to traditional servers connected via 1 Gb Ethernet to a top of rack switch. Furthermore, the system interconnect subsystem 2206 is configured to provide adaptive link width and speed to optimize power based upon utilization.

An underlying objective of the system interconnect subsystem 2206 is support a scalable, power-optimized cluster fabric of server nodes. As such, the system interconnect subsystem 2206 has three primary functionalities. The first one of these functionalities is serving as a high-speed fabric upon which TCP/IP networking is built and upon which the operating system of the node CPU subsystem 2202 can provide transparent network access to associated network nodes and storage access to associated storage nodes. The second one of these functionalities is serving as a low-level messaging transport between associated nodes. The third one of these functionalities is serving as a transport for remote DMA between associated nodes.

The system interconnect subsystem 2206 can be connected to the node CPU subsystem 2202 and the management subsystem 2208 through a bus fabric (i.e., Ethernet AXIs) of the system interconnect subsystem 2206. An Ethernet interface of the system interconnect subsystem 2206 can be connected to peripheral interfaces (e.g., interfaces 2230, 2232, 2234, 2238) of the peripheral subsystem 2204. A fabric switch (i.e., a switch-mux) can be coupled between the XAUI link ports of the system interconnect subsystem 2206 and one or more MAC's 2243 of the system interconnect subsystem 2206. The XAUI link ports and MACs (i.e., high-speed interconnect interfaces) enabling the node that comprises the SoC 2200 to be connected to associated nodes each having their own SoC (e.g., identically configured SoCs).

The processor cores 2222 (i.e., A9 cores) of the node CPU subsystem 2202 and management processor 2270 (i.e., M3) of the management subsystem 2208 can address MACs (e.g., MAC 2243) of the system interconnect subsystem 2206. In certain embodiments, the processor cores 2222 of the node CPU subsystem 2202 will utilize a first MAC and second MAC and the management processor 2270 of the management subsystem 2208 will utilize a third MAC. To this end, MACs of the system interconnect subsystem 2206 can be configured specifically for their respective application.

The management subsystem 2208 is coupled directly to the node CPU subsystem 2202 and directly to the to the system interconnect subsystem 2206. An inter-processor communication (IPC) module (i.e., IPCM) of the management subsystem 2208, which includes IPC 2216, is coupled to the node CPU subsystem 2202, thereby directly coupling the management subsystem 2208 to the node CPU subsystem 2202. The management processor 2270 of the management subsystem 2208 is preferably, but not necessarily, an ARM Cortex brand M3 microprocessor. The management processor 2270 can have private ROM and private SRAM. The management processor 2270 can be coupled to shared peripherals and private peripherals of the management subsystem 2208. The private peripherals are only accessible by the management processor, whereas the shared peripherals are accessible by the management processor 2270 and each of the processing cores 2222. Instructions for implementing embodiments of the present invention (e.g., functionalities, processes and/or operations associated with r4emote memory access, pooled memory access, memcache, distributed memory, server resource disaggregation, and the like) can reside in non-transitory memory coupled to/allocated to the management processor 2270.

Additional capabilities arise because the management processor 2270 has visibility into all buses, peripherals, and controllers. It can directly access registers for statistics on all buses, memory controllers, network traffic, fabric links, and errors on all devices without disturbing or even the knowledge of the access by the core processing cores 2222. This allows for billing use cases where statistics can be gathered securely by the management processor without having to consume core processing resources (e.g., the processing cores 2222) to gather, and in a manner that cannot be altered by the core processor 2222.

The management processor 2270 has a plurality of responsibilities within its respective node. One responsibility of the management processor 2270 is booting an operating system of the node CPU 2210. Another responsibility of the management processor 2270 is node power management. Accordingly, the management subsystem 2208 can also be considered to comprise a power management Unit (PMU) for the node and thus, is sometime referred to as such. As discussed below in greater detail, the management subsystem 2208 controls power states to various power domains of the SoC 2200 (e.g., to the processing cores 2222 by regulating clocks). The management subsystem 2208 is an "always-on" power domain. However, the management processor 2270 can turn off the clocks to the management processor 2270 and/or its private and/or shared peripherals to reduce the dynamic power. Another responsibility of the management processor 2270 is varying synchronized clocks of the node CPU subsystem 2202 (e.g., of the node CPU 2210 and a snoop control unit (SCU)). Another responsibility of the management processor 2270 is providing baseboard management control (BMC) and IPMI functionalities including console virtualization. Another responsibility of the management processor 2270 is providing router management. Another responsibility of the management processor 2270 is acting as proxy for the processing cores 2222 for interrupts and/or for network traffic. For example, a generalized interrupt controller (GIC) of the node CPU subsystem 2202 will cause interrupts intended to be received by a particular one of the processing core 2222 to be reflected to the management processor 2270 for allowing the management processor 2270 to wake the particular one of the processing cores 2222 when an interrupt needs to be processed by the particular one of the of the processing cores that is sleeping, as will be discussed below in greater detail. Another responsibility of the management processor 2270 is controlling phased lock loops (PLLs). A frequency is set in the PLL and it is monitored for lock. Once lock is achieved the output is enabled to the clock control unit (CCU). The CCU is then signaled to enable the function. The management processor 2270 is also responsible for selecting the dividers but the actual change over will happen in a single cycle in hardware. Another responsibility of the management processor 2270 is controlling a configuration of a variable internal supply used to supply electrical power to the node CPU subsystem 2202. For example, a plurality of discrete power supplies (e.g., some being of different power supplying specification than others (e.g., some having different power capacity levels)) can be selectively activated and deactivated as necessary for meeting power requirements of the node CPU subsystem 2202 (e.g., based on power demands of the processing cores 2222, the SCU, and/or the controller of the L2 cache 2214). A separate power control mechanism (e.g., switch) can be used to control power supply to each of the processing cores 2222 and separately to the SCU. Another responsibility of the management processor 2270 is managing a real-time-clock (RTC) that exists on a shared peripheral bus of the management subsystem 2208. Another responsibility of the management processor 2270 is managing a watchdog timer on a private peripheral bus of the management subsystem 2208 to aid in recovery from catastrophic software failures. Still another responsibility of the management processor 2270 is managing an off-board EEPROM. The off-board EEPROM is device is used to store all or a portion of boot and node configuration information as well as all or a portion of IPMI statistics that require non-volatile storage. Each of these responsibilities of the management processor 2270 is an operational functionality managed by the management processor 2270. Accordingly, operational management functionality of each one of the subsystem refers to two or more of these responsibilities being managed by the management processor 2270.

Figure 16:
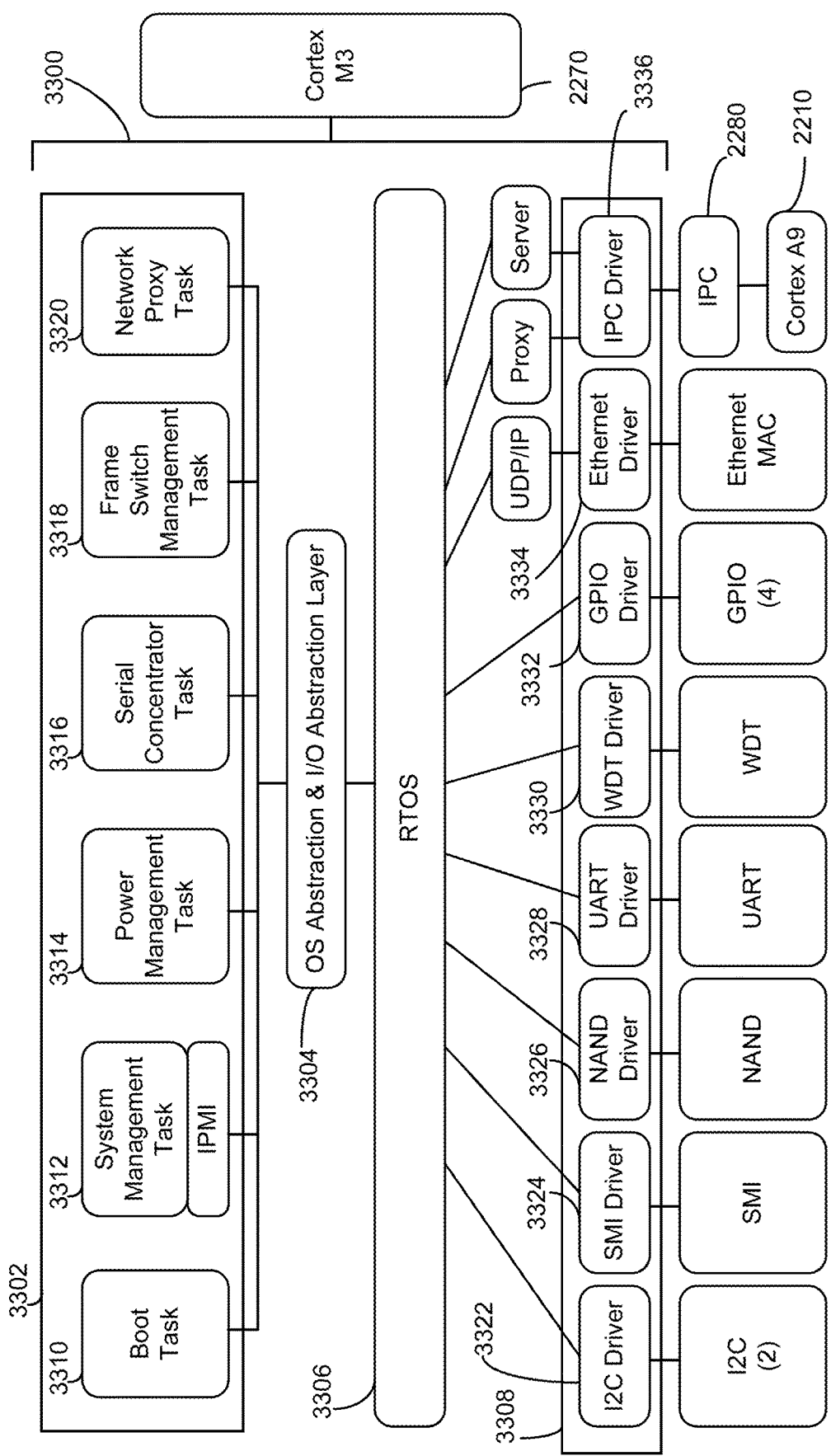
FIG. 16 illustrates a software view of a power management unit.

As shown in FIG. 16, software 3300 is provided on the management processor 2270. The management processor 2270 includes a plurality of application tasks 3302, an operating system (OS)/input-output (I/O) abstraction layer 3304, a real-time operating system (RTOS) 3306, and device drivers 3308 for the various devices. The operating system (OS)/input-output (I/O) abstraction layer 3304 is a software layer that resides between the application tasks3 302 and the real-time operating system (RTOS) 3306. The operating system (OS)/input-output (I/O) abstraction layer 3304 aids in porting acquired software into this environment. The OS abstraction portion of the operating system (OS)/input-output (I/O) abstraction layer 3304 provides posix-like message queues, semaphores and mutexes. The device abstraction portion of the operating system (OS)/input-output (I/O) abstraction layer 3304 provides a device-transparent open/close/read/write interface much like the posix equivalent for those devices used by ported software. The real-time operating system (RTOS) 3306 resides between the operating system (OS)/input-output (I/O) abstraction layer 3304 and the device drivers 3308.

The application tasks 3302 include, but are not limited to, a boot task 3310, a system management task 3312, a power management task 3314, a serial concentrator task 3316, a frame switch management task 3318 (sometimes called routing management), and a network proxy task 3320. The boot task 3310 provides the function of booting the processing cores 2222 and the management processor 2270. The system management task3 312 provides the function of integrated operation of the various subsystems of the SOC 2200. The power management task 3314 provides the function of managing power utilization of the various subsystems of the SOC 2200. The serial concentrator task 3316 provides the function of managing communication from the other application tasks to a system console. This console may be directly connected to the SOC node via a DART (i.e., a universal asynchronous receiver/transmitter) or it can be connected to another node in the system. The frame switch management task 3318 (sometimes called routing management) is responsible for configuring and managing routing network functionality. As discussed in greater detail below, the network proxy task 3320 maintains network presence of one or more of the processing cores 2222 while in a low-power sleep/hibernation state and to intelligently wake one or more of the processing cores 2222 when further processing is required.

Device drivers 3308 are provided for all of the devices that are controlled by the management processor 2270. Examples of the device drivers 3308 include, but are not limited to, an I2C driver 3322, a SMI driver 3324, a flash driver 3326 (e.g., NAND type storage media), a UART driver 3328, a watchdog time (i.e., WDT) driver 3330, a general purpose input-output (i.e., GPIO) driver 332, an Ethernet driver 3334, and an IPC driver 336. In many cases, these drivers are implemented as simple function calls. In some cases where needed for software portability, however, a device-transparent open/close/read/write type I/O abstraction is provided on top of these functions.

In regard to boot processes, it is well known that multiple-stage boot loaders are often used, during which several programs of increasing complexity sequentially load one after the other in a process of chain loading. Advantageously, however, the node CPU 2210 only runs one boot loader before loading the operating system. The ability for the node CPU 2210 to only run one boot loader before loading the operating system is accomplished via the management processor 2270 preloading a boot loader image into main memory (e.g., DRAM) of the node CPU subsystem before releasing the node CPU 2210 from a reset state. More specifically, the SOC 2200 can be configured to use a unique boot process, which includes the management processor 2270 loading a suitable OS boot loader (e.g., U-Boot) into main memory, starting the node CPU 2210 main OS boot loader (e.g., UEFI or U-Boot), and then loading the OS. This eliminates the need for a boot ROM for the node CPU, a first stage boot loader for the node CPU, and dedicated SRAM for boot of the node CPU.

While the foregoing has been with reference to a particular embodiment of the invention, it will be appreciated by those skilled in the art that changes in this embodiment may be made without departing from the principles and spirit of the disclosure, the scope of which is defined by the appended claims.

What is claimed is:

1. A method comprising performing the following at a first node server:
   determining that a second node server has data stored in a memory of the second node server;
   sending a remote mapping request to the second node server to map a physical address in the memory in the second node server storing the data to an address space of the first node server, wherein the second node server is configured to determine whether to accept or deny the remote mapping request;
   in response to the second node server accepting the remote mapping request, mapping the physical address in the memory in the second node server to the address space of the first node server; and
   accessing the data the stored in the physical address in the memory in the second node server using the mapping.

2. The method of claim 1, wherein determining that the second node server has the data comprises correlating a data identifier of the data to a value corresponding to a node identifier of the second node server.

3. The method of claim 1, wherein accessing the data comprises receiving the data using a remote memory access channel.

4. The method of claim 1, wherein accessing the data comprises directly accessing the physical address.

5. The method of claim 1, wherein:
   the first node server comprises a node density configuration enabling the first node server to provide information computing resources to one or more data processing systems; and
   the second node server comprises a memory configuration enabling the second node server to enable memory resources thereof to be allocated to caching data for applications running on the one or more data processing systems.

6. The method of claim 1, further comprising in response to the second node server denying the remote mapping request, the first node server is unable to access the data.

7. A non-transitory computer-readable medium having tangibly embodied thereon and accessible therefrom a set of instructions interpretable by one or more data processing devices of a first node server in a cluster of nodes, wherein the set of instructions is configured to cause the one or more data processing devices of the first node server to implement operations for:
   determining that a second node server has data stored in a memory of the second node server;
   sending a remote mapping request to the second node server to map a physical address in the memory in the second node server storing the data to an address space of the first node server, wherein the second node server is configured to determine whether to accept or deny the remote mapping request;

in response to the second node server accepting the remote mapping request, mapping the physical address in the memory in the second node server to the address space of the first node server; and accessing the data the stored in the physical address in the memory in the second node server using the mapping.

8. The non-transitory computer-readable medium of claim 7, wherein determining that the second node server has the data comprises correlating a data identifier of the data to a value corresponding to a node identifier of the second node server.

9. The non-transitory computer-readable medium of claim 7, wherein accessing the data comprises receiving the data using a remote memory access channel.

10. The non-transitory computer-readable medium of claim 7, wherein accessing the data comprises directly accessing the physical address.

11. The non-transitory computer-readable medium of claim 7, wherein the first node server comprises a node density configuration enabling the first node server to provide information computing resources to one or more data processing systems; and the second node server comprises a memory configuration enabling the second node server to enable memory resources thereof to be allocated to caching data for applications running on the one or more data processing systems.

12. The non-transitory computer-readable medium of claim 7, wherein in response to the second node server denying the remote mapping request, the first node server is unable to access the data.

13. A system comprising:

a first node server; and a second node server;

wherein the first node server is configured to:

determine if the second node server has data stored in a memory of the second node server;

send a remote mapping request to the second node server to map a physical address in the memory in the second node server storing the data to an address space of the first node server, wherein the second node server is configured to determine whether to accept or to deny the remote mapping request;

in response to the second node server accepting the remote mapping request, map the physical address in the memory in the second node server to the address space of the first node server; and access the data the stored in the physical address in the memory in the second node server using the mapping.

14. The system of claim 13, wherein determining that the second node server has the data stored comprises correlating a data identifier of the data to a value corresponding to a node identifier of the second node server.

15. The system of claim 13, wherein accessing the data comprises directly accessing the physical address.

16. The system of claim 13, wherein the first node server has a node density configuration.

17. The system of claim 13, wherein the first node server is coupled to the second node server by a remote memory access channel.

18. The system of claim 13, wherein:

the first node server comprises a node density configuration enabling the first node server to provide information computing resources to one or more data processing systems; and the second node server comprises a memory configuration enabling the second node server to enable memory resources thereof to be allocated to caching data for applications running on the one or more data processing systems.

19. The system of claim 13, wherein in response to the second node server denying the remote mapping request, the first node server is unable to access the data.

* * * * *